United States Patent [19]
McDaniel et al.

[11] Patent Number: 5,285,678
[45] Date of Patent: Feb. 15, 1994

[54] CONTAINER SEAL TESTING AND PRESSURIZATION

[75] Inventors: Gale E. McDaniel, Kennewick; Patrick K. McDaniel, Richland, both of Wash.

[73] Assignee: Seal Integrity Systems, Inc., Richland, Wash.

[21] Appl. No.: 289,591

[22] Filed: Dec. 21, 1988

Related U.S. Application Data

[63] Continuation-in-part of Ser. No. 182,980, Apr. 18, 1988, abandoned, which is a continuation-in-part of Ser. No. 106,229, Oct. 6, 1987, Pat. No. 4,930,342, which is a continuation-in-part of Ser. No. 938,027, Dec. 4, 1986, Pat. No. 4,747,298.

[51] Int. Cl.$^5$ .............................. G01M 3/02
[52] U.S. Cl. .......................... 73/49.3; 73/52
[58] Field of Search ............ 73/40.7, 49.3, 49.2 R, 73/52, 37, 40.7

[56] References Cited

U.S. PATENT DOCUMENTS

| | | | |
|---|---|---|---|
| 900,324 | 10/1908 | Swangren | 73/49.3 |
| 1,825,744 | 10/1931 | Landrum | 73/49.3 |
| 2,093,429 | 9/1937 | Foss | 73/51 |
| 2,107,922 | 2/1938 | Westin | 73/51 |
| 2,819,609 | 1/1958 | Liebhafsky | 73/40.7 |
| 2,885,892 | 5/1959 | Coutts | 73/159 |
| 3,251,218 | 5/1966 | Russell | 73/52 |
| 3,574,642 | 4/1971 | Weinke | 99/174 |
| 3,667,281 | 6/1972 | Pfeifer | 73/37 |
| 3,855,531 | 12/1974 | Fielibert et al. | 324/65 R |
| 3,905,233 | 9/1975 | Smith, Jr. et al. | 73/432 R |
| 3,958,448 | 5/1976 | Willis et al. | 73/37 |
| 3,973,249 | 8/1976 | Yokote et al. | 340/242 |
| 3,998,091 | 12/1976 | Paquette et al. | 73/52 |
| 4,188,819 | 2/1980 | Egee et al. | 73/52 |
| 4,205,551 | 6/1980 | Clifford et al. | 73/52 |
| 4,409,818 | 0/1983 | Wyslotsky et al. | 73/40 |
| 4,507,114 | 3/1985 | Bohman et al. | 73/49.3 |
| 4,555,056 | 11/1985 | Bernhardt | 229/45 R |
| 4,555,935 | 12/1985 | Elert | 73/52 |
| 4,577,488 | 3/1986 | Broadus et al. | 73/40 |
| 4,588,085 | 5/1986 | Sussman | 206/438 |
| 4,649,740 | 3/1987 | Franklin | 73/49.3 |
| 4,697,452 | 10/1987 | Prakken | 73/49.3 |
| 4,706,494 | 11/1987 | Creed et al. | 73/49.3 |
| 4,709,578 | 12/1987 | Iwasaki et al. | 73/49.3 |
| 4,733,555 | 3/1988 | Franks | 73/49.3 |
| 4,747,298 | 5/1988 | McDaniel | 73/49.3 |
| 4,774,830 | 0/1988 | Hulsman et al. | 73/49.3 |
| 5,156,329 | 10/1992 | Farrell | 73/49.3 |

FOREIGN PATENT DOCUMENTS

| | | | |
|---|---|---|---|
| 48306 | 6/1983 | Japan | 73/49.3 |
| 48805 | 5/1988 | Japan | 73/49.3 |
| 284403 | 12/1967 | U.S.S.R. | 73/37 |
| 48811 | 11/1988 | U.S.S.R. | 73/49.3 |

Primary Examiner—Hezron E. Williams
Assistant Examiner—Michael Brock
Attorney, Agent, or Firm—Wells, St. John, Roberts, Gregory & Matkin

[57] ABSTRACT

A method and apparatus for nondestructively testing sealed containers to proof test for seal leaks present in one or more container seals formed between mating parts of a container. The apparatus preferably includes a container rest or support assembly which holds a container being tested. The container support can advantageously include two corresponding testing head members which are movably mounted on a frame to clamp peripheral portions of the container to form a secondary seal outward of the primary seal which is being tested for leakage. The secondary seal creates a test chamber defined within marginal edge portions of the container which is adjacent the primary seal for applying a testing pressure thereto. Some of the preferred embodiments include a passage forming device for forming a testing fluid supply passage into the test chamber. The passage forming device can be an injection probe which forms an opening and injects a pressurized testing fluid into the test chamber. Also shown is a testing device adapted for supplying a test pressure to preformed testing fluid supply openings located along the marginal portions of the sealed containers to communicate the desired testing pressure to the enclosed test chamber. The invention further includes a container adapted for use in the novel apparatus and using the novel method for nondestructive testing and pressurization. Preferred embodiments of the container include a preformed recess or channel provided outward of the primary seal to at least partially form the testing chamber. Preformed openings and preformed secondary seals are also included in some preferred forms of the inventive container.

56 Claims, 16 Drawing Sheets

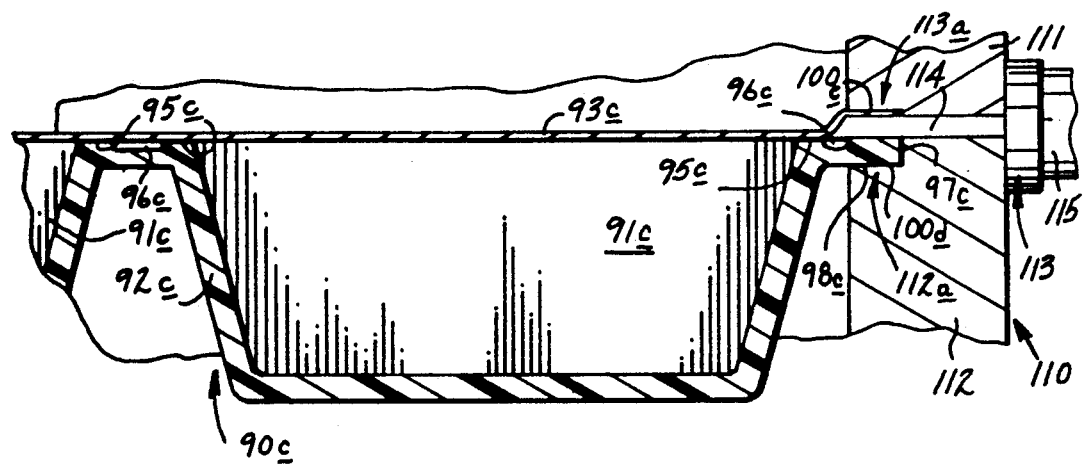
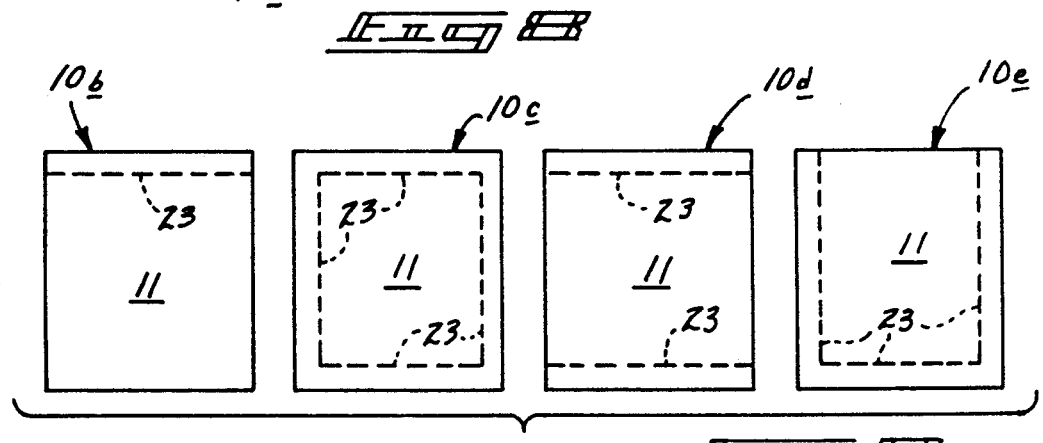
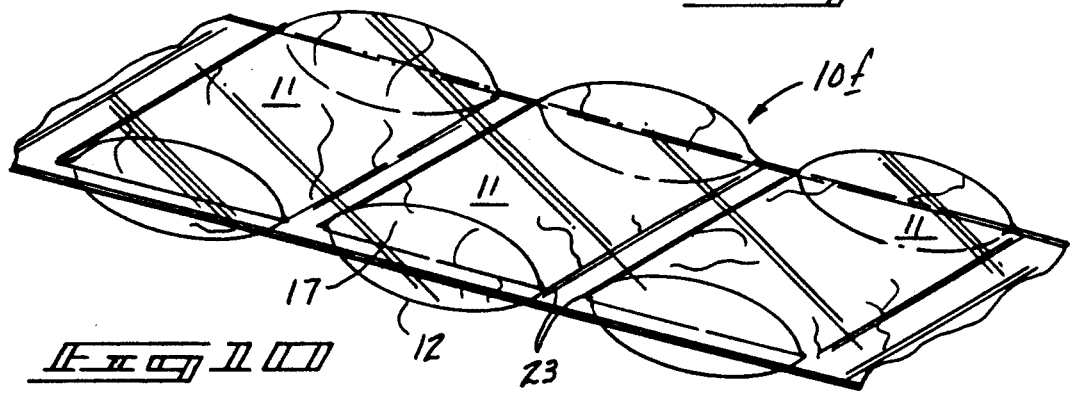
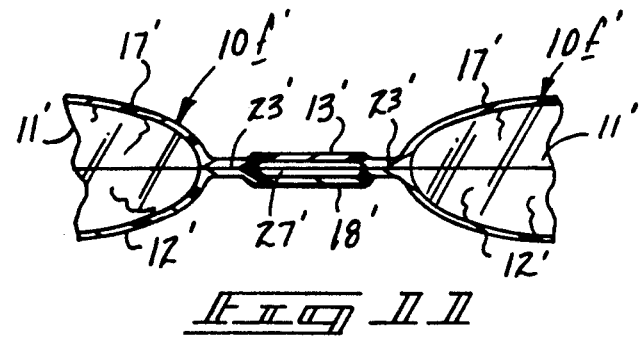

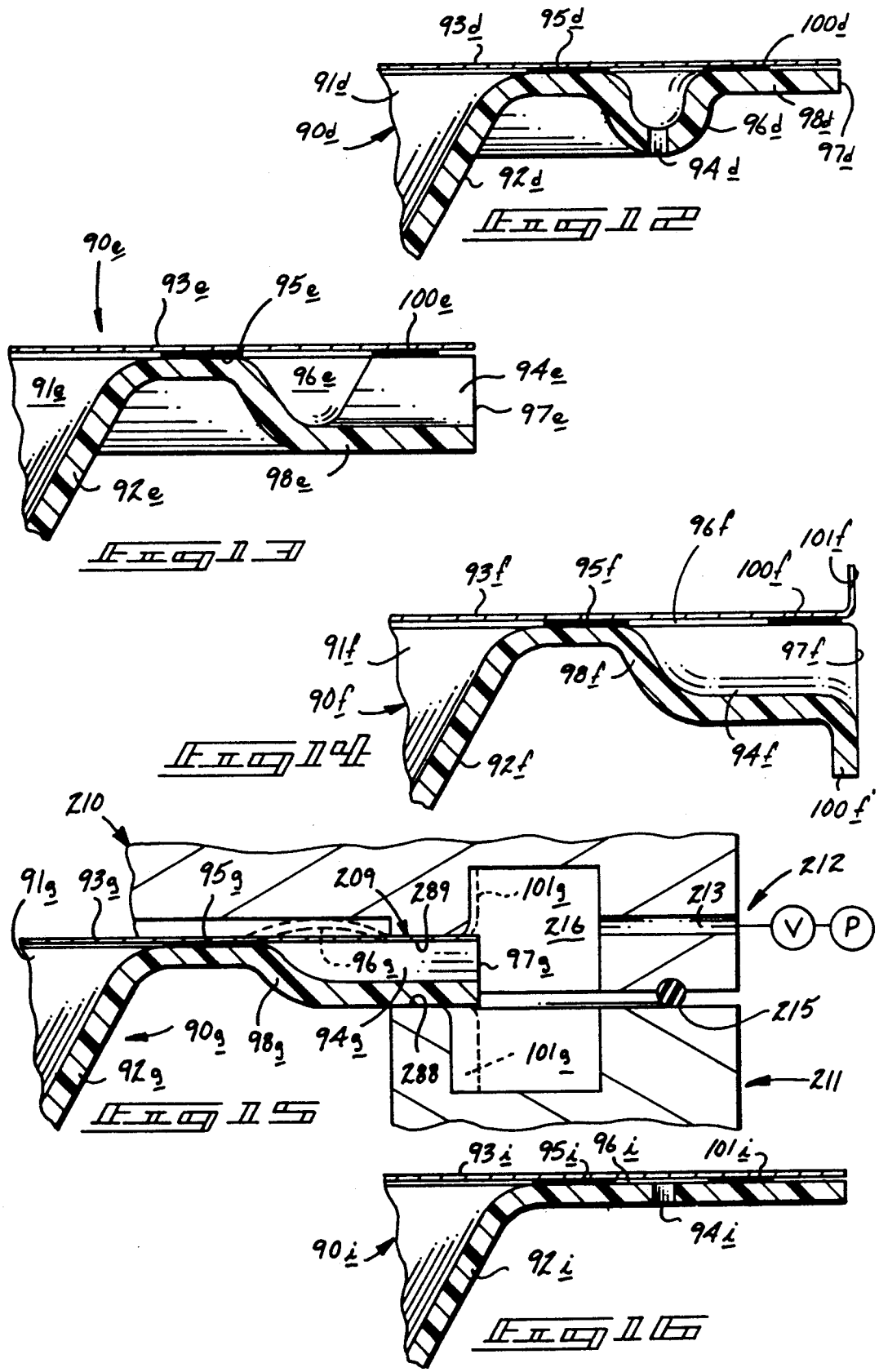

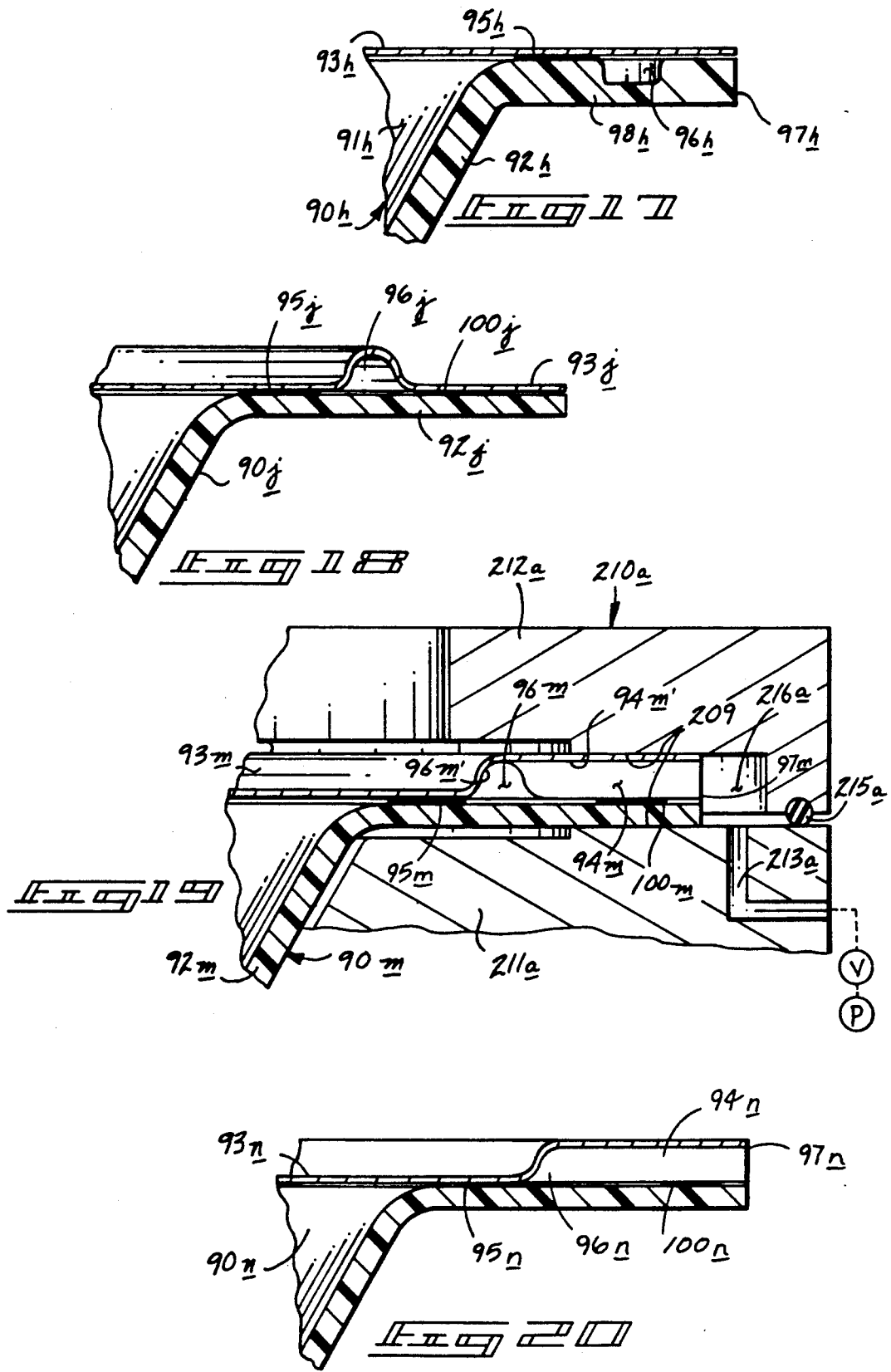

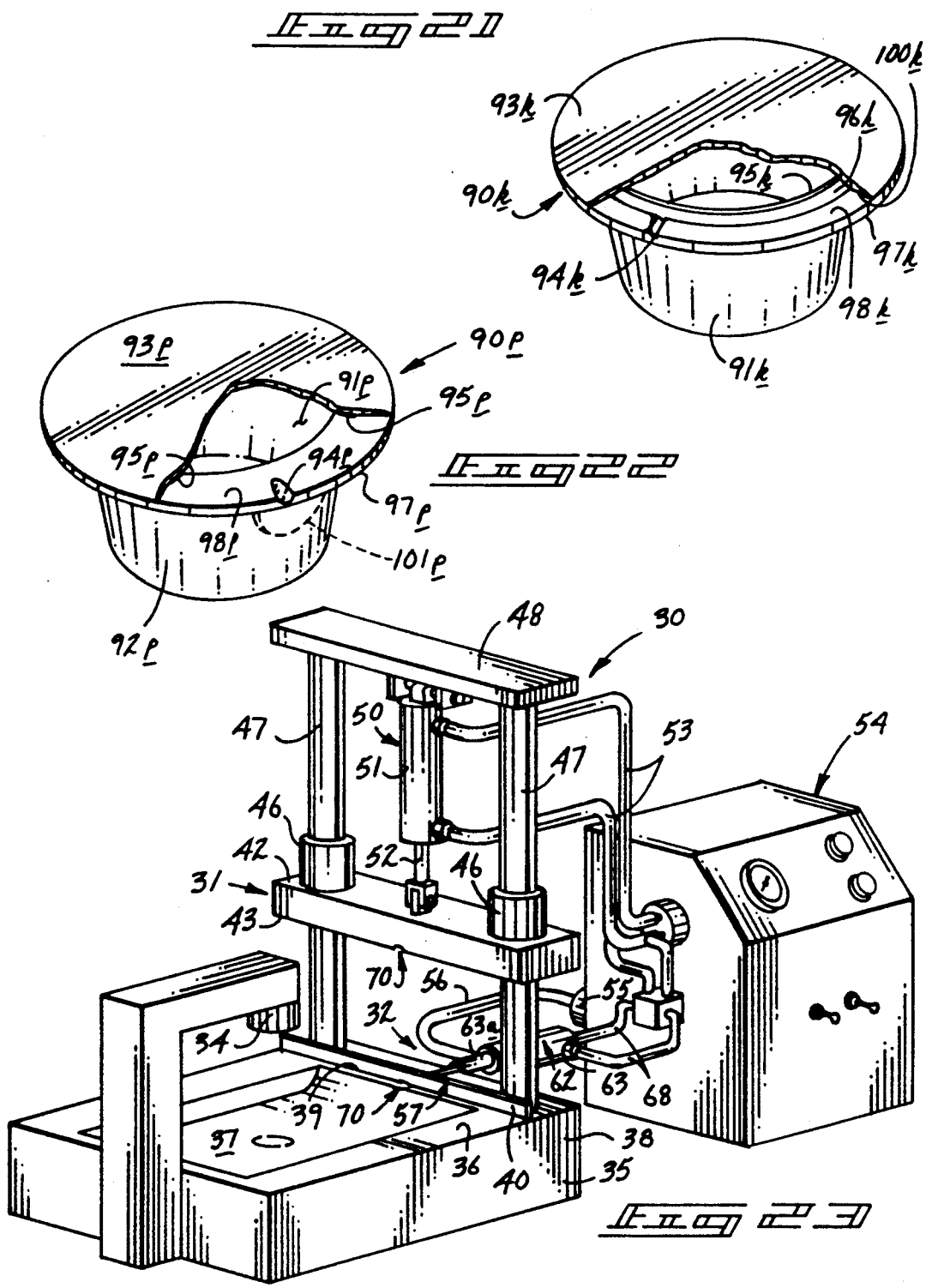

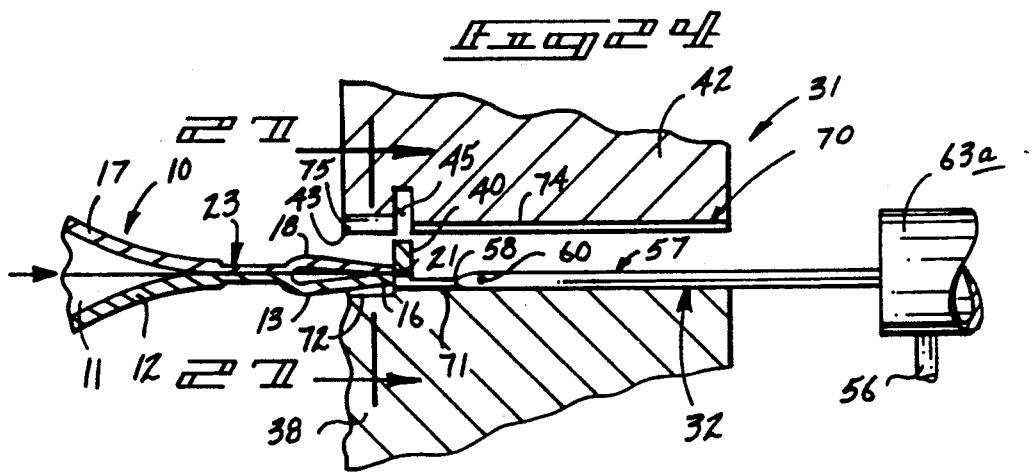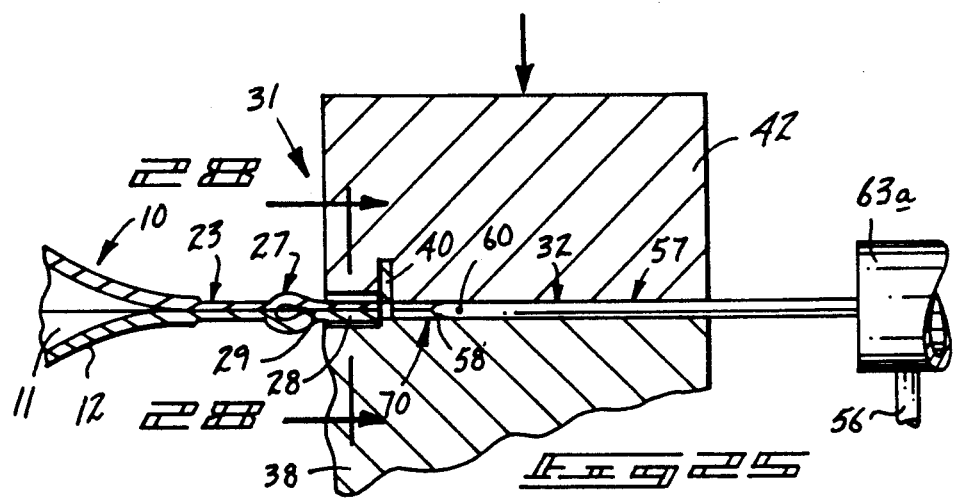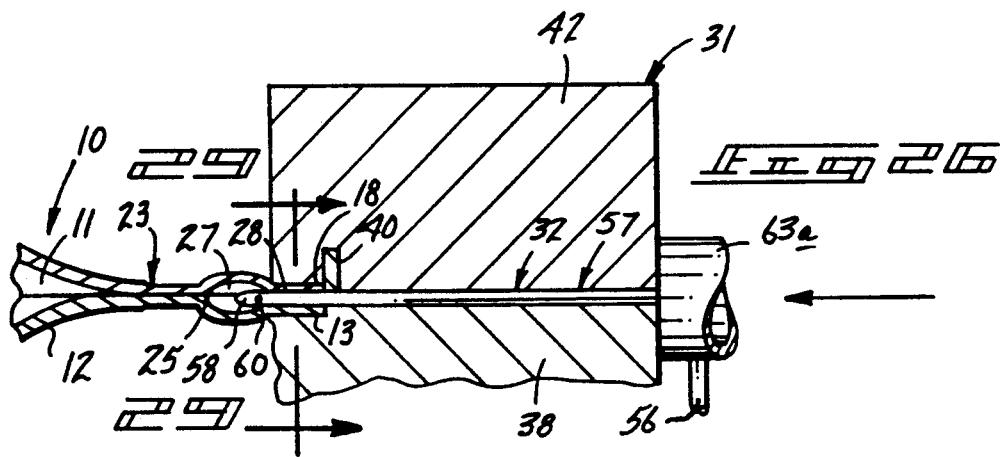

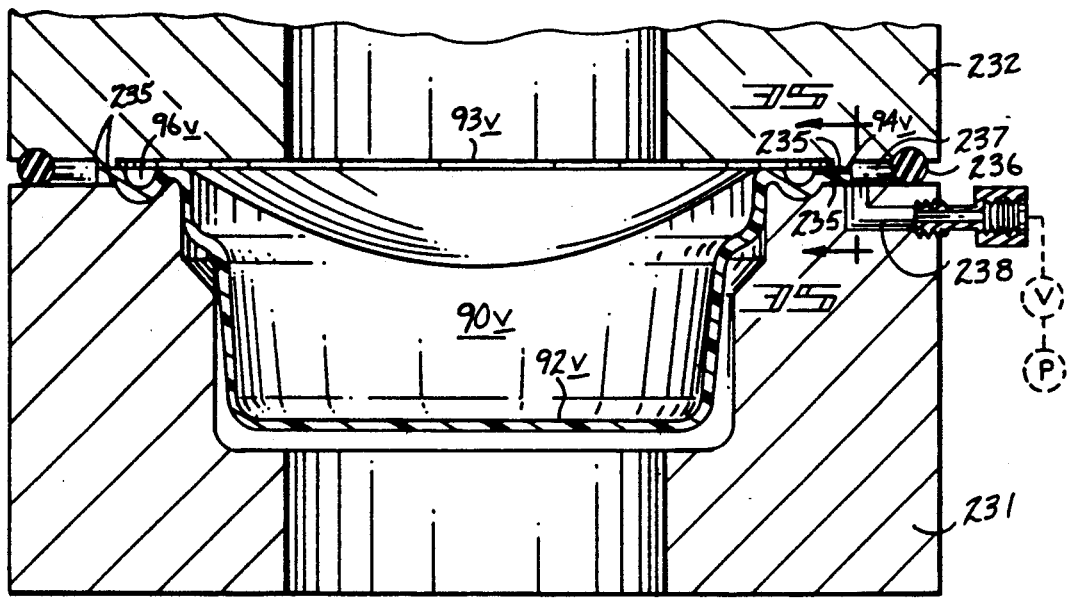
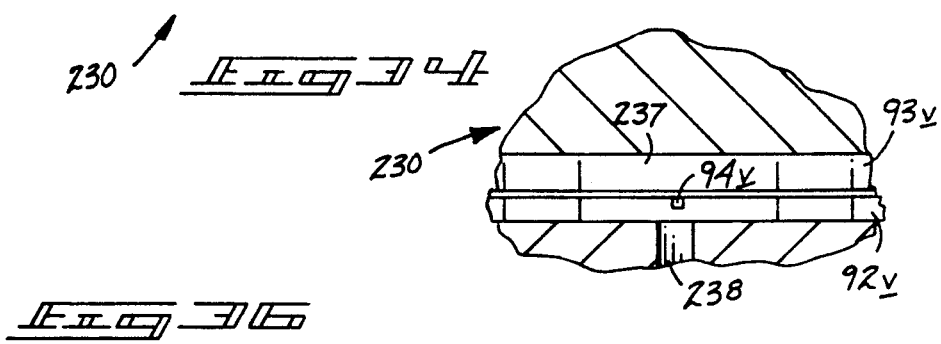
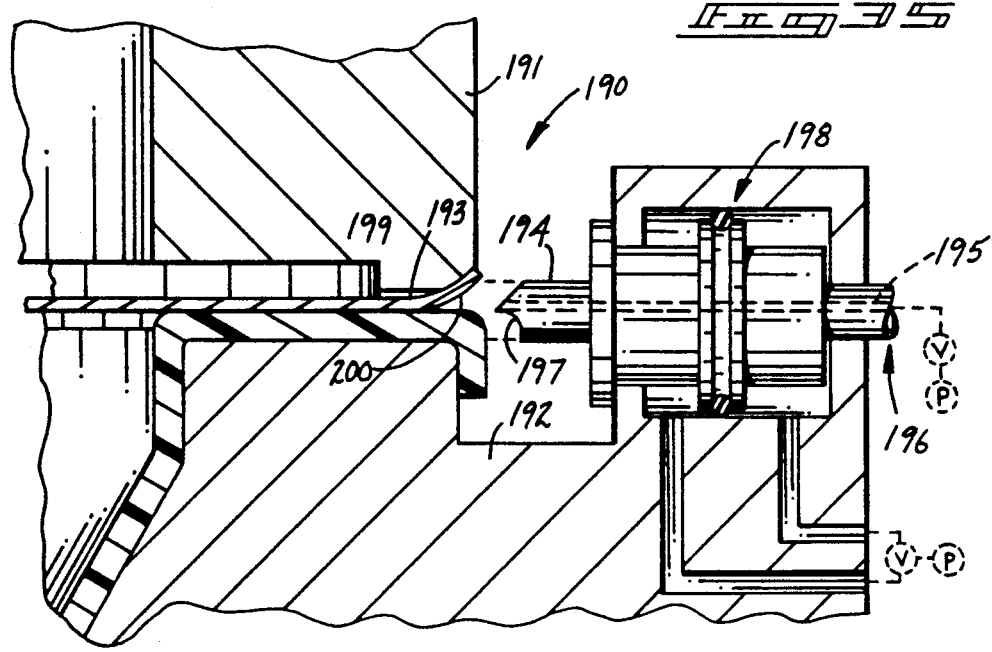

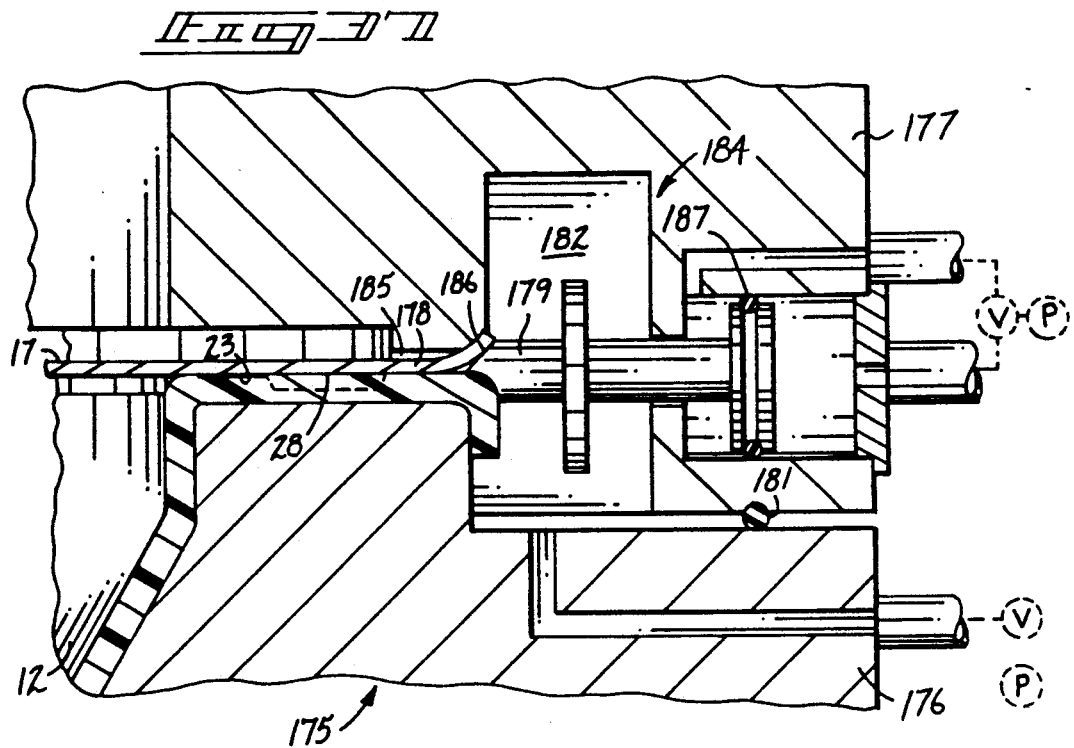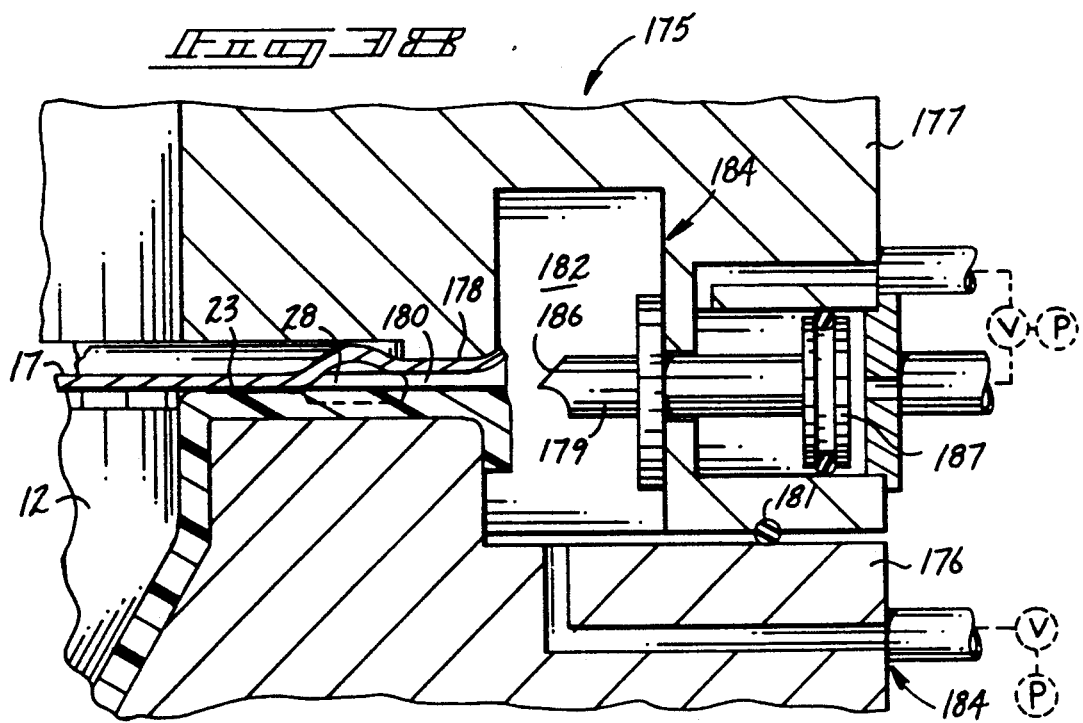

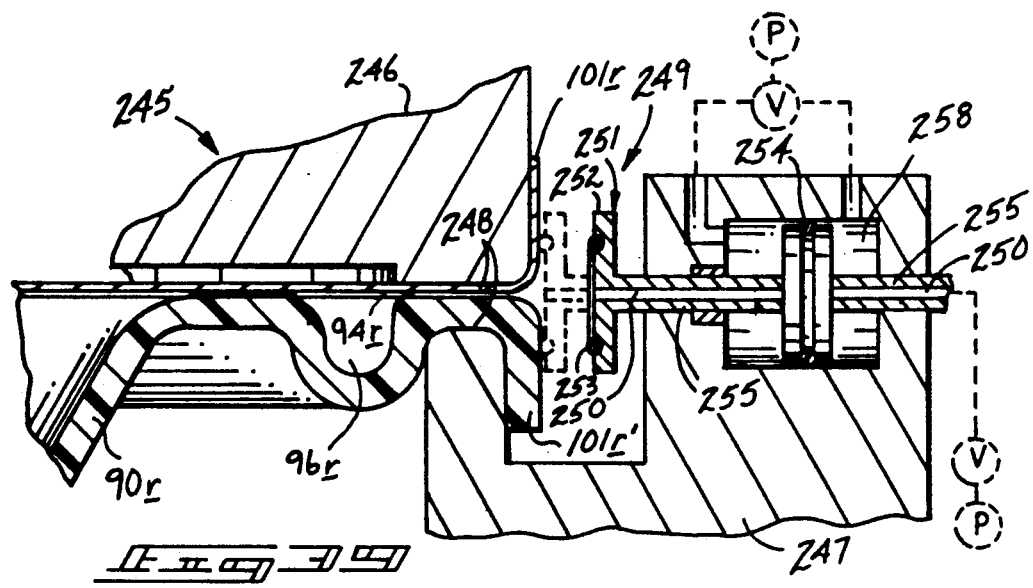
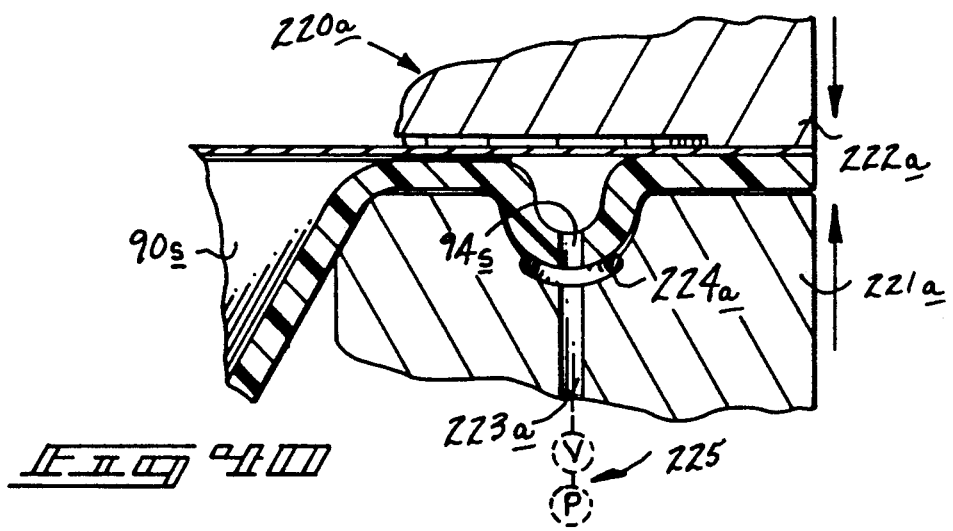
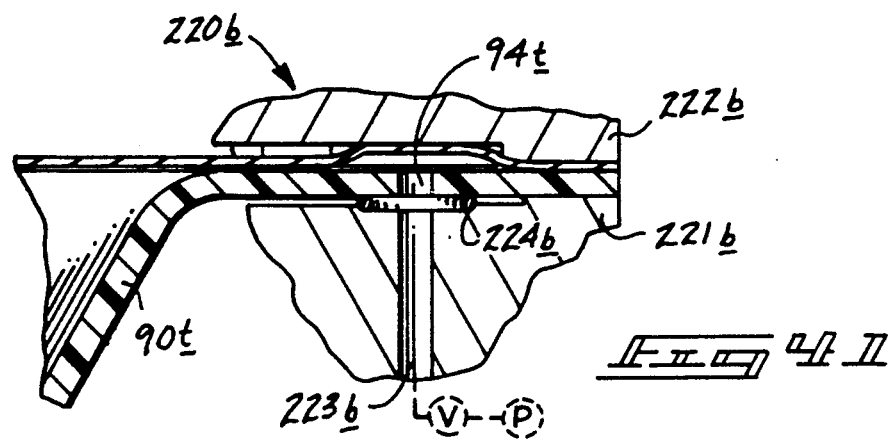

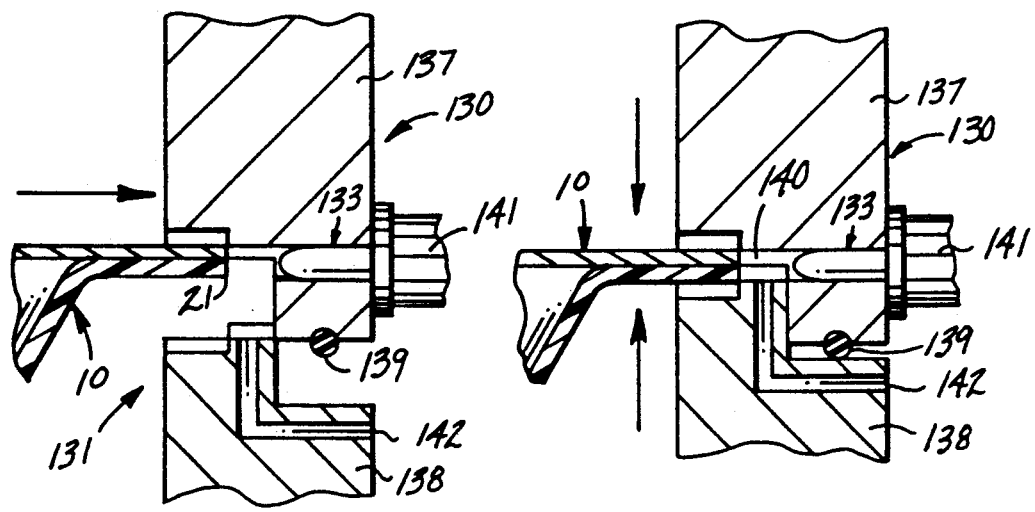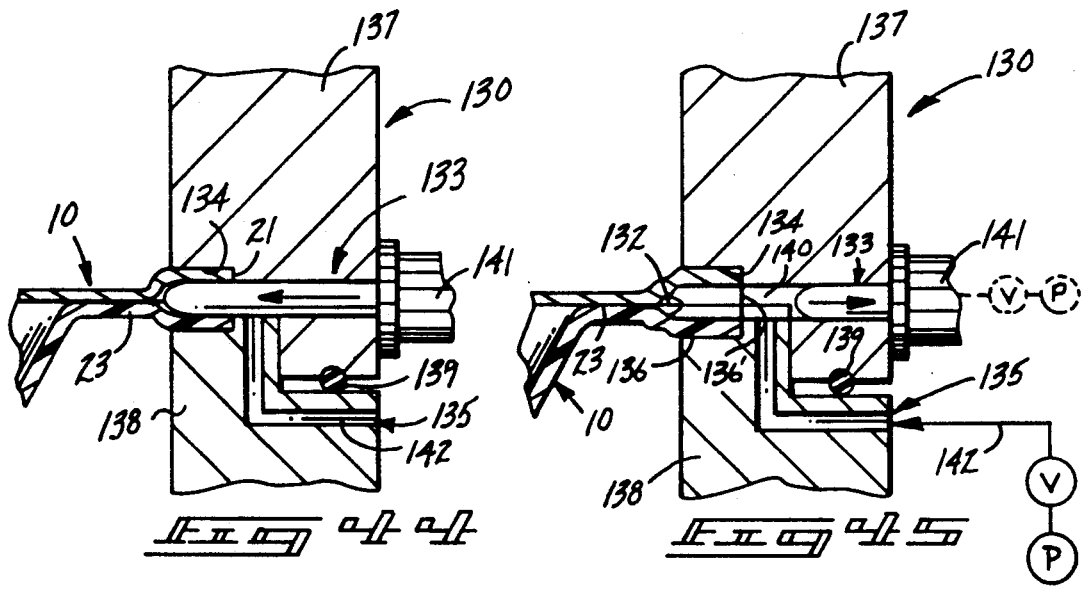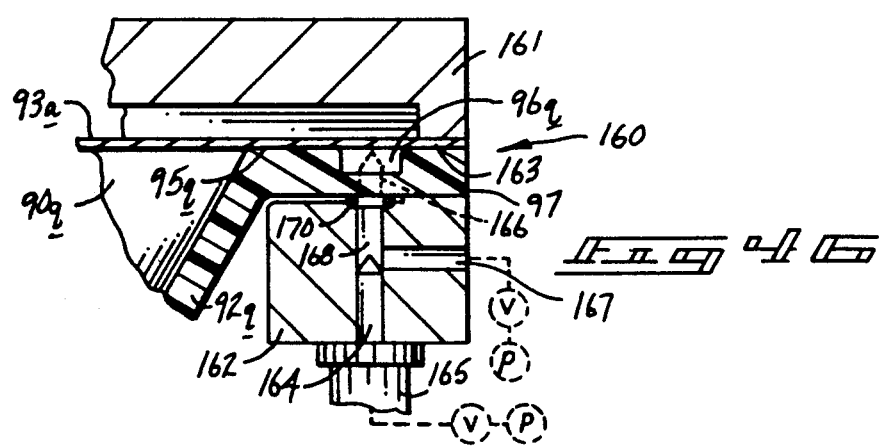

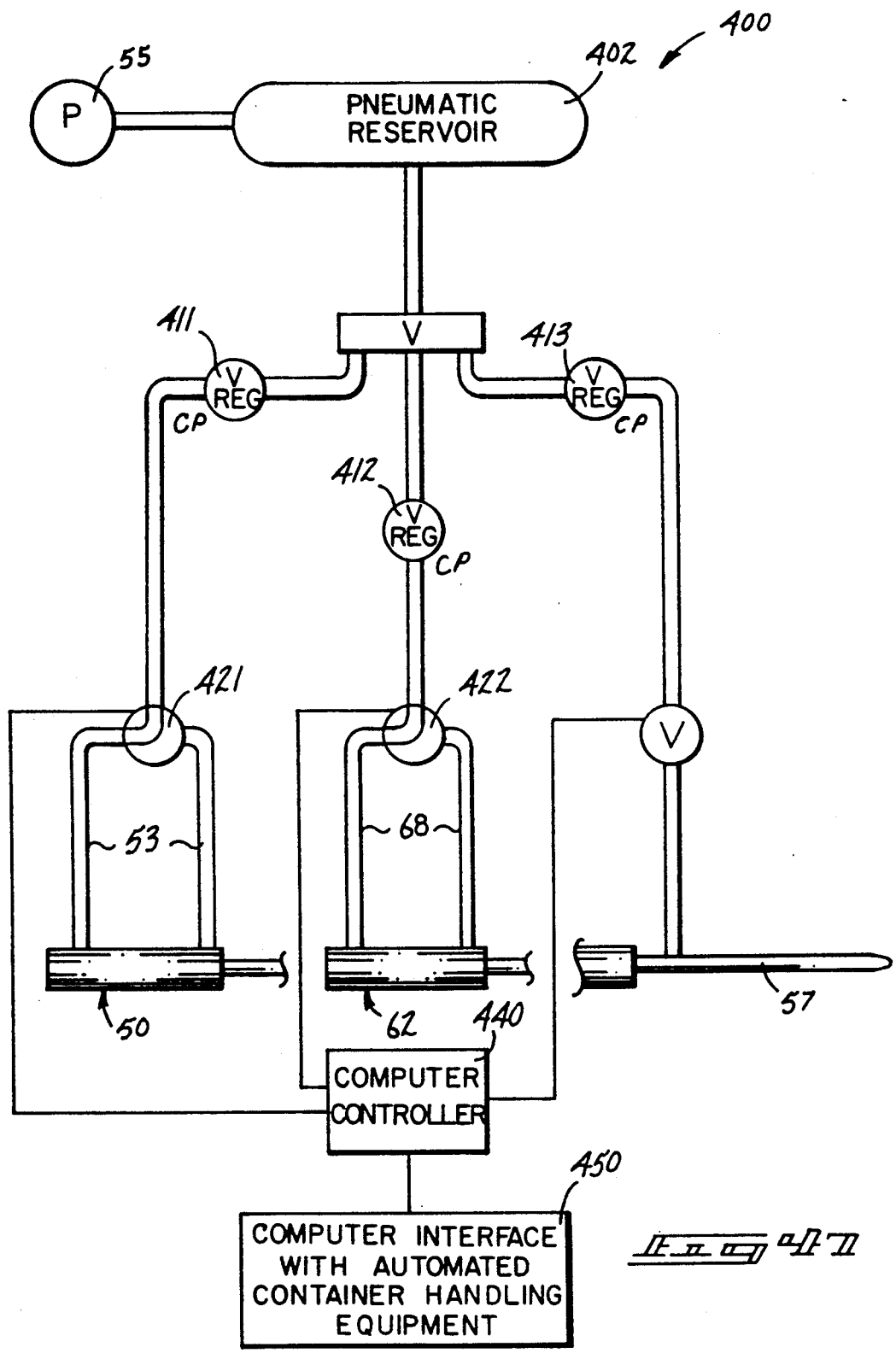

CONTAINER SEAL TESTING AND PRESSURIZATION

CROSS-REFERENCE TO RELATED APPLICATIONS

This application is a continuation-in-part of U.S. patent application Ser. No. 182,980, filed Apr. 18, 1988 now abandoned; which is a continuation-in-part of U.S. patent application Ser. No. 106,229, filed Oct. 6, 1987 now U.S. Pat. No. 4,930,342; which is a continuation-in-part of U.S. patent application Ser. No. 938,027, filed Dec. 4, 1986, which is now U.S. Pat. No. 4,747,298, issued May 31, 1988.

TECHNICAL FIELD

This invention relates to container seal integrity testing methods, apparatus and container members with means for aiding detection of seal leaks.

BACKGROUND OF THE INVENTION

In the packaging industry, particularly in food processing, it is common to package perishables in sealed containers formed of, for example, foil, paper, metal, plastic, ceramic or combinations thereof. The contents may be deposited in an internal material receiving compartment formed in a body or receptacle portion of the container and then covered with a flexible cover that is glued or heat sealed about the compartment. With bags or packet type containers, the contents are often inserted through an open end of the container which is subsequently sealed. In order to prevent contamination and subsequent spoiling of perishables packed in such containers, it is essential that the seal be airtight.

During packaging some of the containers develop leaks or otherwise are not sealed with an airtight seal. It is particularly important in the food packaging industry to detect such defectively sealed containers before the containers are shipped to retail outlets and subsequently purchased by a consumer. It is also important to detect defective container seals early in the processing or packaging cycle to minimize the cost associated with further processing and handling of such containers and their contents. This is an especially difficult problem with bags or packaging where portions of the lid or cover and the container body such as a bowl, tray or other surface opposite the cover, extend outwardly beyond the seal. The outward projections obstruct the seal which would otherwise be available for test procedures as disclosed in U.S. Pat. No. 4,747,298. Product quality control considerations often require testing of every container after it has been sealed. Because of this, it is not reasonable to destructively test the containers, so a reliable non-destructive testing system must be used.

Container leak testing apparatus used to test each container should be capable of fast operation in order to handle the high throughput of many high speed packaging and container sealing processes. It is further desirable to have a container testing system which can be integrated into such high speed processing lines and used to provide reliable proof testing of the containers for leaks.

There have been numerous prior art attempts to develop reliable high speed, non-destructive container seal testing equipment. For example, U.S. Pat. No. 4,409,818 to Wyslotsky discloses a seal testing device and method for testing the integrity of a seal in a sealed package. The package is required to include a continuous seal adjacent the sealed material holding compartment. The seal is formed between two films that form the package and that extend outward of the seal to define a marginal edge portion of the package. A clamp arrangement of the device is used to bind the marginal edge portion outward of the seal. An air supply is used to blow relatively low pressure air between the two films. The air is supplied through a centrally located preformed hole in the upper cover film. A detector is used to detect deflection of the package responsive to a leak if present in the seal. The device requires that a hole be present in the film for such testing purposes and, further requires use of a combination vacuum-pressure head which engages outer surfaces of the lid to blow air down through the hole in the lid. The vacuum arrangement is used to draw one film away from the other to permit supply of air through the hole. The fluid supply includes a tube that is centered within the vacuum arrangement and which must be aligned with the hole in order to deliver fluid pressure to the area between the films separated by the vacuum arrangement. The vacuum force required to separate the films could have the effect of separating the seal and thereby producing a leak where none previously existed. Furthermore, the alignment of the vacuum head, the supply head, with the hole in the adjacent film must be precise because of the dual pressure-vacuum functions else the desired separation of the films will not take place or the fluid injection will not properly occur, such as where the vacuum head overlaps the hole.

U.S. Pat. No. 4,774,830 to Hulsman discloses a device which was intended to overcome problems perceived in the Wyslotsky device described above. The Hulsman apparatus makes use of an externally applied pressure chamber for isolating the external edge of a flange seal and applying a test pressure thereto. Containment of the pressure chamber includes sealing pressure applied directly to the seal which is being tested for leaks. A self compensating biasing mechanism is provided in an attempt to minimize the clamping force which necessarily occurs against the seal. The clamping device of the Hulsman apparatus may defeat the purpose of proof testing by temporarily sealing small leaks which exist in the container seal. Such leaks occur in seals that have small entrapped air or moisture pockets or other defects. Such defects may be flattened and sealed by the clamping pressure applied to the container seal which is required to maintain the external pressure chamber in the Hulsman device. Such defective containers will pass the Hulsman proof test but may later re-open. Such testing thus suffers a serious reliability problem which is addressed by the current invention.

Other conventional apparatus utilized for placing contents of a package under "external" vacuum to determine leaks represent earnest attempts at solutions to the problem of testing closed containers yet most are relatively slow and dependent upon unpredictable variables such as packaging material variances and compressibility of package contents and the tendency for the package contents to block leaks.

The advantage of vacuum test systems using internal vacuum forces within the packaging is that leaks, if present, will occur from the atmosphere inwardly toward the package contents. There is no opportunity for the package contents to block the leak and thereby provide false indication that a leak is not present. To the contrary, inward motion of air or other gas through a leak will have a tendency to unplug a leak and thus provide a relatively reliable indication of the leak, if accurate detection mechanisms are utilized. However, such procedures and apparatus have not been sufficiently reliable for use in packaging where portions of the cover "flap" and the container substrate "lip" extend outwardly beyond the seal being tested because of the tendency for the vacuum pressure to pull the cover flap tightly against the substrate lip. This action could result in a dangerous situation in which leaks would be temporarily closed during the testing procedure, but that would reopen at a later time.

Container seal testing problems are amplified in areas where multiple containers are formed and covered with a single cover. Such multiple container construction often occurs just prior to filling of the containers with a food or other product. Then, immediately following the filling procedure, the single continuous cover is applied over the open container ends. Testing of these "form and fill" type containers is a difficult and time consuming undertaking. Procedures involving destructive testing may be utilized on the individual containers. However, destructive type testing results in loss of product. Further, it is typically not feasible to recycle product from a destructively tested container if the container is interconnected integrally with a number of other assumed satisfactory containers or filled containers. Thus, adequate containers and testing apparatus, especially in compound container and cover systems has remained a difficult problem in the container forming and food packaging industries.

From the above, it is readily seen that attempts have been made to test for leaks in sealed containers. While the solutions offered and suggested by the above references in many cases function adequately for specialized applications, there remains a need for testable containers and for a fast and more reliable testing method and apparatus by which container seals, such as those that are overlapped outwardly by container members, may be tested for leaks. There also remains a strong need to proof test without applying any clamping forces to the seal being tested.

BRIEF DESCRIPTION OF THE DRAWINGS

Preferred embodiments of the invention are illustrated in the accompanying drawings, in which:

FIG. 8 is a sectional view of a portion of the container shown in FIG. 7 taken along line 8—8 therein, and additionally showing such container placed in the apparatus for testing seals according to this invention;

FIG. 9 is a diagrammatic view illustrating various forms of bags or pouches which can incorporate novel seal configurations of this invention and which are capable of being tested by apparatus made according to this invention;

FIG. 10 is a perspective view of a series of interconnected containers, such as bags, incorporating features as described hereinafter;

FIG. 11 is an enlarged fragmentary sectional view of the juncture between two novel successive bag or pouch type containers;

FIG. 12 is a fragmentary sectional view illustrating a further novel embodiment of a testable container in which a test chamber is defined between primary and secondary seals with a testing fluid supply passage in fluid communication therewith;

FIG. 13 is a fragmentary sectional view of a further embodiment of a testable container including a test chamber, secondary seal, and fluid supply passage leading to outward edges of the container;

FIG. 14 is a fragmentary sectional view of a container embodiment including an outward secondary seal and a fluid passage leading to outward peripheral edges with flanged fluid communicating fittings formed thereat;

FIG. 15 is a view similar to FIG. 14 showing a further alternative embodiment container of this invention without provision of an outward preformed secondary seal; the container is shown in a testing apparatus according to this invention;

FIG. 16 is a sectional view showing portions of a still further embodiment of container in which an integral secondary seal is provided and a fluid passage is provided to communicate with a test chamber area between the primary and secondary seals;

FIG. 17 is further partial sectional view showing another variation of container of this invention in which testing chamber is partially formed as a recess in the flange of a container body;

FIG. 18 is further fragmentary sectional view illustrative of a container variation including a test chamber formed between performed primary and secondary seals;

FIG. 19 is a partial sectional view illustrative of a further embodiment of testable container similar to the embodiment of FIG. 18 and provided with a testing fluid supply passage leading to outward peripheral edges of the container and in which apparatus for testing this form of container is also diagrammed;

FIG. 20 is partial sectional view illustrative of a container variation similar to that shown in FIG. 19 but provided with a testing fluid passage leading from a peripheral edge to a test area between primary and secondary seals;

FIG. 21 is a pictorial view of a further preferred embodiment of container having a recessed fluid passage and recessed test chamber;

FIG. 22 is a pictorial view of a further novel testable container variation including a testing fluid supply passage;

FIG. 23 is a pictorial view illustrating general features of a seal testing apparatus of the present invention;

FIGS. 24–26 are sectional views showing operational steps of an apparatus and process by which a container of the form illustrated in FIGS. 1 and 2 is tested;

FIGS. 33 and 34 are further partial sectional views illustrative of a preferred apparatus and process steps for testing of novel containers having fluid passages formed therein as exemplified in FIGS. 6, 13-15, 19, 21 and 22;

FIG. 35 is a fragmentary sectional view taken substantially along line 35—35 in FIG. 34;

FIG. 36 is a partial sectional view of a novel testing apparatus and illustrating process steps by which various container configurations may be tested;

FIGS. 37 and 38 are partial sectional views showing an additional preferred form of testing head assembly and process steps in which a solid piloting probe is utilized, along with fluid pressure to form a testing pressure communication passage in containers;

FIG. 39 is a further sectional view showing portions of a novel container, testing device and procedure by which containers having testing fluid communication flanges may be tested;

FIG. 40 is a partial sectional view illustrating a testing apparatus and test procedure by which container configurations similar to that illustrated in FIG. 12 may be tested;

FIG. 41 is a partial sectional view showing a testing apparatus configuration and process steps by which testable containers similar to that shown in FIG. 16 may be tested;

FIGS. 42-45 are fragmentary sectional views illustrating a further preferred container seal testing apparatus and process steps by which a solid probe may be utilized to form a testing fluid passage between container members;

FIG. 46 is a sectional view showing portions of a testing head assembly illustrative of an apparatus and process steps by which a testing fluid passage may be formed by a solid probe into a container having an integral test chamber; and FIG. 47 is a diagrammatic view showing a preferred fluid supply and control system.

DETAILED DESCRIPTION OF THE PREFERRED EMBODIMENTS

Figure 1:
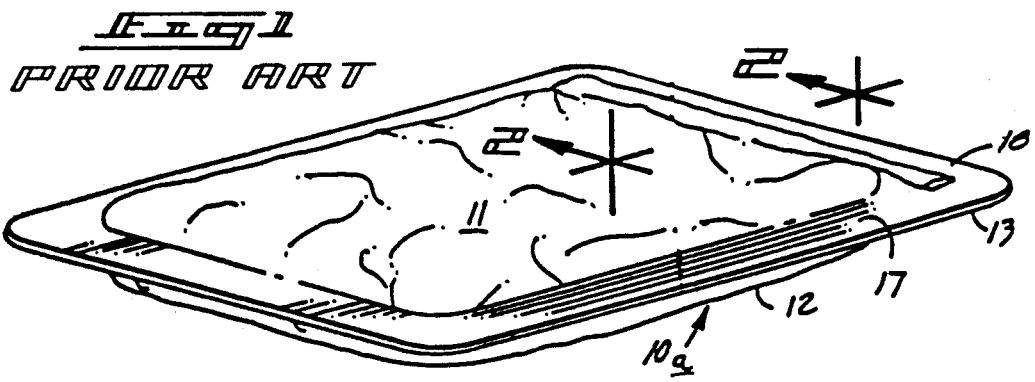
FIG. 1 is a perspective view of a prior art sealed package.

The following disclosure of the invention is submitted in compliance with the constitutional purpose of the Patent Laws "to promote the progress of science and useful arts" (Article 1, Section 8).

The present invention arose as a solution to the need for testable containers and for a high speed, reliable, nondestructive testing methods and apparatuses for aiding testing of container seals and seams wherein marginal edge portions of the containers overlap or extend beyond the seam or seal, which are hereinafter collectively referred to as seals.

Described and claimed are variations of novel testable containers along with apparatuses and processes for testing the seals thereof. Also described and claimed are apparatuses and processes for testing seal integrity of conventional containers having characteristics described below.

Bag or pouch type containers 10a–10f are illustrated in FIGS. 1, 2, 9 and 10 of the accompanying drawings. Such containers may take a wide variety of shapes, such as bags, pouches, packets, envelopes, etc. Each of the containers marked 10a–10f have common features which for sake of brevity will hereinafter be described once in connection with the container of FIGS. 1 and 2. Container 10a includes at least one internal material receiving compartment 11. Internal compartment 11 is defined on one side by a first container member 12 having an outwardly extending marginal lip 13. For purposes of later description, lip 13 is shown including a top surface 14 and a bottom surface 15 extending outward to an outer peripheral edge 16.

The containers 10 also include second members 17. Second members 17 include a marginal flap 18 that overlies the lip 13. The flap includes a bottom surface 19 that meets with the top lip surface 14. It also includes a top surface 20. Surfaces 19 and 20 extend outward to an outer peripheral edge 21 that may terminate at the same approximate extent as the outer edge 16.

It is important to note that the first and second container members 12 and 17 may be integral and consist of parts of a single container film, such as with certain forms of bags. Such container parts or members can be of the same or of different materials, and of equal or different thickness dimensions. For example, the first member 12 may be formed of an aluminum, plastic, coated polymer or other materials commonly used in containers such as bags, pouches, bowls, trays, plates and others. The second member 17 may be formed as an opposed similarly shaped structure, or as a thin, flexible membrane such as a foil or plastic layer that is intended to be removed from the first member to facilitate access to contents within the material receiving compartment 11. In the example shown in FIG. 1, the first and second container members are similar materials.

Figure 2:
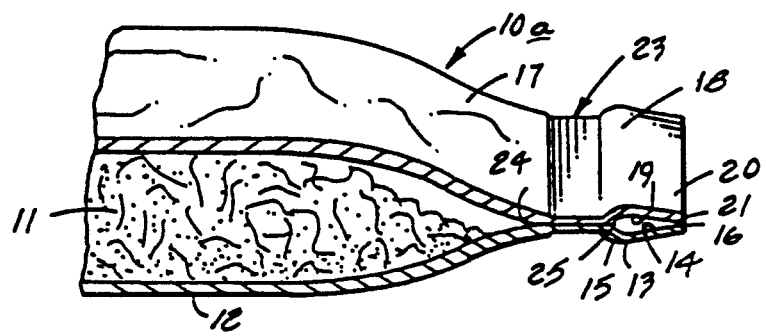
FIG. 2 is an enlarged fragmentary sectional view through the package as seen from line 2—2 in FIG. 1.

First and second container members 12 and 17 (FIGS. 1, 2) are joined by a primary seal 23 (FIG. 2). The seal 23 may be formed by adhesive, heat sealing or fusion of the two members. The seal may also be formed by a physical interlock. The seal 23 is situated between the members 12 and 17. Seal 23 includes an inward seal edge 24 that is substantially contiguous with the material receiving compartment 11. The seal also includes an outward seal edge 25 that is situated inwardly of the container edges 16 and 21.

FIG. 9 illustrates various forms of bag or pouch type containers which may be made to incorporate features of the present invention in the form of bags or pouches. Such containers may be formed from folded flexible sheet stock, tubular sheet extrusions, or molded forms sealed by heat, sonic welding or other seal forming methods across one or more ends. Containers 10b–10e shown in FIG. 9 indicate by dashed lines a placement of primary seals 23. Container 10b shows a single seal 23, the remainder of the container being integrated as by a molding or thermoforming process. The configuration of container 10c shows a peripheral primary seal 23 as where the container members are comprised of two separate sheets. Container 10d shows two opposite end seals 23 as where the container is formed from an extruded tube, then sealed at opposed ends to form a sealed container. Container 10e shows a three sided primary seal configuration 23 as where the container is formed with a fold defining one side thereof.

The above container forms may be produced in mass quantities with one or more sides interconnected as exemplified in FIG. 10. The containers may be filled and sealed when so interconnected, then later separated. Alternatively, they may be separated into single units or sets containing multiple units before filling and sealing.

The various forms of sealed containers described above include common features which are utilized for testing purposes with the apparatuses and processes provided in accordance with this invention. Each includes a seal on one side of an internal container compartment and marginal edge portions of the container members extending outward of the seal. Such containers need not include novel features as described herein in order to benefit from the novel methods and apparatuses for sealed container testing.

FIGS. 3-8, and 11-22 show novel containers including one or more novel container members with features that aid in quick, reliable testing of primary container seals by alternate forms of the inventive testing apparatus and process described herein. The novel sealed containers described herein generally include two interconnected container members or container parts. The container members or parts, denoted generally as first and second container members or parts, each or both include novel features which separately, or in combination aid in testing various forms of container seals which interconnect between the two members.

It is emphasized that novel features discussed may be included in one or the other of the container members or both. Thus, novel features described in relation to a first container member may likewise be provided in the second member, though it may be described using distinct terms. Novel testable container members described below therefore include substantially interchangeable novel features among one another and among the two container members provided in each described container.

In general, novel container members described herein typically include one or more material compartment surfaces, a primary seal surface, and a test chamber surface or a testing fluid supply passage, or both test chamber and fluid passage surfaces. The primary or container seal surface is located outward of the internal compartment surface. The test chamber surface and fluid passage surfaces are situated outwardly adjacent the seal surface. More detailed relationships of these surfaces will be understood from the specific embodiments described below.

FIG. 11 exemplifies a container 10f that is similar to containers 10a-f but which incorporates novel features to facilitate pressurization and seal integrity testing. Such features may be also incorporated in single or multiple compartmented flexible bag or pouch type containers as shown in FIGS. 9 and 10.

The novel container 10f is provided with first and second container members 12', 17' that form material receiving compartments 11'. Primary seals 23' are formed between the first and second members 12' and 17'. The two interconnected compartments 11' are separated by integral, overlapping marginal lips 13' and flaps 18'.

Inwardly facing surfaces of the marginal lips 13' and flaps define a test area or chamber 27' outward of the seals 23". The test chamber 27' is adapted to receive differentially pressurized testing fluid applied by novel apparatus and method steps described below. The test chamber 27' shown is common to both adjoining containers. The single test chamber 27' will thus serve to aid testing of both adjacent seals 23'. A similar alternative test chamber (not shown) may be provided in single or interconnected container and seal configurations shown in FIGS. 9 and 10.

In bag or pouch configurations, the novel container members may be formed of like materials that are flexible. Such "flexible" materials may be selected from conventional synthetics or metal alloy foils that are presently used to produce conventional sealed or sealable bags. Flexible containers or flexible container parts for purposes of this document will mean parts in which the material receiving compartment will readily deform due to normal handling forces without retaining the predetermined set or shape in which such part was formed.

Figure 3:
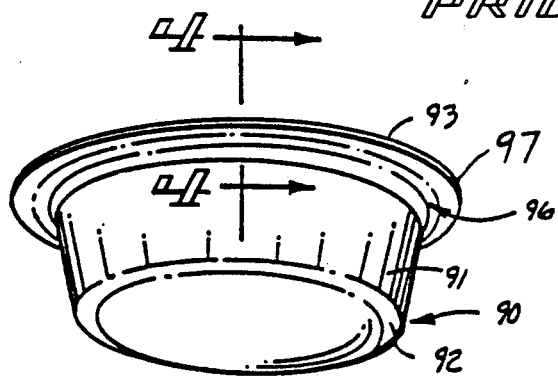
FIG. 3 is a perspective view of a first, novel form of container embodying features according to the present invention.
Figure 4:
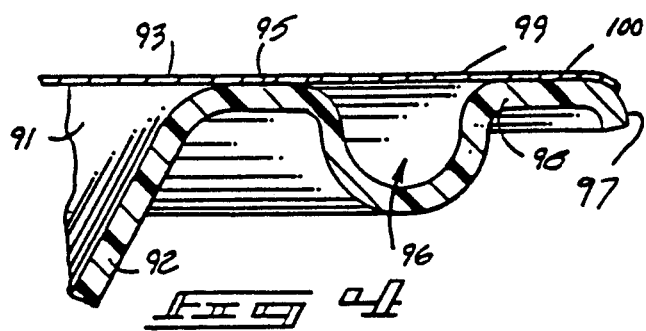
FIG. 4 is an enlarged fragmentary sectional view taken along line 4—4 in FIG. 3.

A novel testable container 90 is shown in FIGS. 3 and 4. Container 90 includes a novel first semirigid container member 92 which is comprised of a bowl or cup shaped body portion formed with a material receiving surface area along an interior thereof. The material receiving surface is adjacent to an internal compartment 91.

As with other novel container member embodiments described herein, the first member 92 of the FIG. 3, 4 embodiment is formed initially as an unsealed container blank from a semirigid material such as a polymer, particularly synthetic polymer materials that are adapted to be formed into self supporting container shapes and to receive a mating cover or second container member to provide a complete novel testable sealed container.

For example, the semi-rigid member may be formed of polypropylene in bonded or fused barrier layers, thermoformed to a desired container blank configuration with the present novel features integrated therein. As another example, the first member may be formed of an appropriate polyvinylidene chloride polymer by known techniques into the desired container "first member" configuration.

The above semi-rigid material provides sufficient support for whatever contents are to be received in the compartment. However, such material provides additional advantages in relation to particular novel features to be described in further detail below.

In the FIG. 3 embodiment, the semirigid first member includes an annular outwardly extending lip 98, leading to a peripheral rim or edge 97. The lip circumscribes the compartment and includes a substantially planar top surface adapted to receive a cover member. The top surface thus includes an annular primary seal surface area immediately adjacent to and circumscribing the compartment for supporting a primary seal 95 when the first member blank is joined with a second or cover member 93.

An important feature of the first novel container member is provision of an annular groove or indentation formed in the lip 98, radially outward of the primary seal area and inward of the rim or edge 97. The groove circumscribes the compartment and the primary seal area. The groove or indentation is open at the top planar surface of the lip. It is preferably formed as the first member is formed by conventional container forming techniques. The semirigid material serves to form and maintain the groove in the configuration suggested for pressurization and testing steps described below.

The top surface of the lip 98 includes a secondary seal area that at least partially circumscribes the annular groove, extending outwardly of the groove to the rim or edge 97. The second seal area is preferably but not necessarily coplanar with the primary seal surface. It extends outward from the open end of the groove to an edge or rim of the first container member.

To form a complete, novel sealed testable container, a second container member 93 is provided as a manually separable cover. The cover is preferably of a flexible material such as foil or plastic that is less rigid than the material forming the first member 92. It is secured to the first member 92 over the compartment 91 and is utilized to complete a fluid-tight enclosure of the compartment by an annular primary seal 95 formed between associated primary seal surfaces on the container members.

An integral annular test chamber 96 extends about the compartment 91, outwardly adjacent to the primary seal 95. Test chamber 96 is advantageously formed by the annular indentation in the outwardly projecting lip 98 that extends outward of the test chamber to the peripheral container rim or edge 97. The test chamber 96 is enclosed by inwardly facing or top side surfaces of the annular groove or indentation formed in the marginal edge portions of the first member 92 and by inwardly facing or bottom side surfaces of an outwardly projecting marginal edge portion of second member 93 forming a cover flap 99. Flap 99 extends outwardly to the container edge 97. The cover flap is preferably separable from the lip at the edge 97.

Test chamber 96 is adjacent to the outward edge of seal 95. It may also be inward of mating secondary seal surfaces of the container members. A secondary seal 100 (FIG. 4) may alternatively be provided in the same manner as the first seal 95. Secondary seal 100 is inward of the outer container edge 97.

FIG. 17 shows relevant portions of another embodiment of a novel container member and testable container 90h according to this invention. Container 90h is similar to container 90 shown in FIGS. 3 and 4 and described above. Container 90h includes similarly designated features with the addition of an "h" to the reference numeral. Test chamber 96h is formed as a shallow upwardly open integral recess or groove in the marginal flange or lip 98h of first container member 92h. It extends as an annulus about the internal compartment 91h outward of the primary seal surface and inward of the secondary seal surface. In FIGS. 17 and 21 the bottom surface of the lip 98h and 98k is relatively flat. FIGS. 3 and 4 illustrate a formed version wherein the bottom surface of lip 98 is shaped similarly to the contour of the test chamber. The FIGS. 17 and 21 groove configuration may be formed by impressing the semirigid material of the first member, or may be formed with the container member by known molding techniques.

Figure 5:
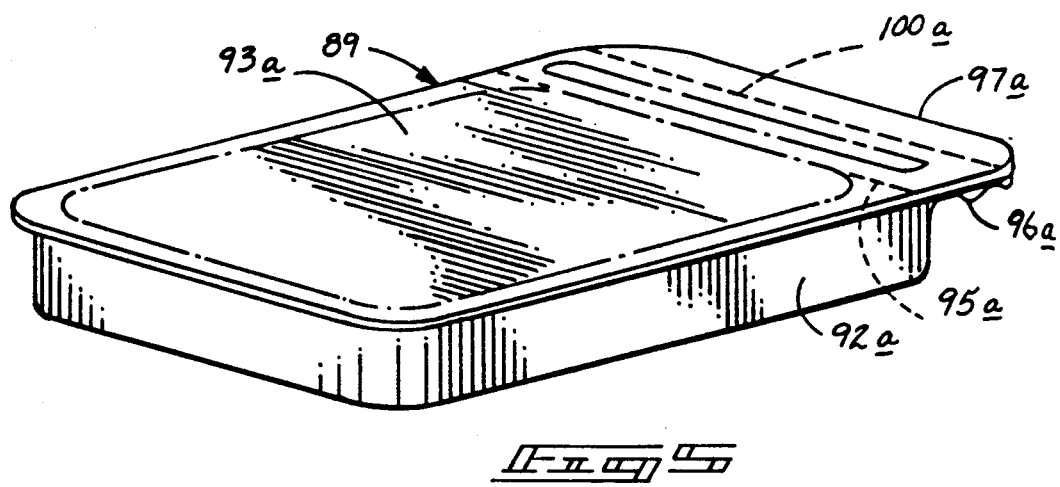
FIG. 5 is a perspective view of a tray-type container including features according to the present invention.

Another alternative novel container member and testable container 89 is illustrated in FIG. 5. Container 89 includes a linear, non-circuitous test chamber 96a outward of an end primary seal 95a. The chamber 96a is preferably formed by a groove in the first container member 92a if the first member is formed of semirigid material as described above. However, where the first member 92a is formed of the same material as the second member 93a, the chamber 96a may be formed in either member, or both. Regardless of placement or how formed, chamber 96a is preferably defined along one side thereof by an outward edge of the primary seal 95a. It is also situated inward of the container outer peripheral edge 97a. An integral preformed secondary seal 100a may be formed inward of edge 97a, between the container members in a manner similar to seal 95a with the ends of the secondary seal run to meet against the primary seal to enclose a test chamber.

The basic difference between the first two novel container member configurations is the continuity of the test chambers 96, 96a. Chamber 96 is continuous and circuitous, extending entirely about or circumscribing an associated container compartment, and is useful in containers formed of two different container members attached to one another via a primary seal surrounding the material compartment. Chamber 96a on the other hand is of finite length, extending substantially along the associated primary seal. Chamber 96a is thus useful particularly on containers such as packets, bags and the like formed with the first and second container members integral, at least along one side of the container, substantially as exemplified in FIG. 9 at 10b.

Figure 6:
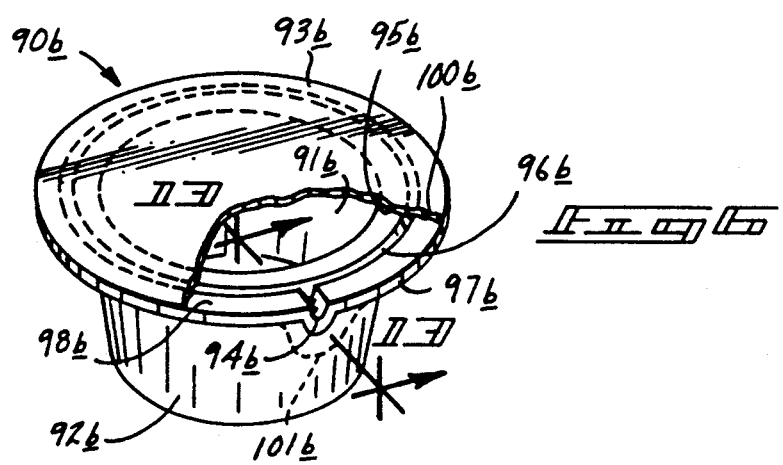
FIG. 6 is a perspective view of a container with an integral test chamber and fluid passageway, portions of the container are removed.

Container members forming another form of novel testable container 90b are shown in FIG. 6. A still further container 90k similar to container 90b is shown in FIG. 21. Features common to both of these embodiments are similarly numbered except by the change of reference numeral postscript "b" to "k", except as otherwise indicated.

The first novel container member 92b of container 90b is advantageously formed of semirigid material and includes a material receiving compartment 91b. A second container member 93b, preferably of a flexible material (as indicated above) is utilized to close the material receiving compartment 91b along a primary seal 95b.

An integrally formed test chamber recess 96b is formed in one of the members, preferably the base or first container member as shown, such as in marginal lip 98b that extends about the compartment outwardly adjacent to an outer side of seal 95b. The annular test chamber is in part formed by the upwardly open recess 96b inward of a container outer edge 97b. The test chamber in the completed, sealed testable container is further confined by adjacent test chamber surfaces of the first and second container members 92b and 93b. A preformed secondary seal 100b may also be provided as an alternative, securing the first and second members outwardly of the integral test chamber 96b and inward of the edge 97b.

An important feature of the first novel container member 92b in this container version is the inclusion of a notch or recess running radially outwardly from the test chamber to form a fluid passage 94b which acts as a means for communicating a desired testing pressure to the test chamber. The testing fluid supply passage 94b may be formed in either of the container members, but is preferably included in the embodiment shown by FIG. 6 in the upper marginal lip surface of first member 92b as shown. Fluid passage 94b is advantageously radial, extending between an inner end opening in fluid communication with test chamber 96b and an open distal or peripheral end at the outward edge 97b. Fluid passage 94b opens outwardly along edge 97b to facilitate access by components of the present apparatus for applying a desired fluid pressure to the test chamber to develope a desired differential pressure across primary seal 95b.

It should be noted that fluid passages similar to 94b may also be provided in other container member configurations, including a pouch, carton, bag, etc. since the fluid passage 94b is not dependent upon a particular test chamber configuration. Such testing pressure supply passages can be formed in one, both or multiple parts or members forming the sealed container. Such passages can also be formed in between the container members or parts.

Figure 7:
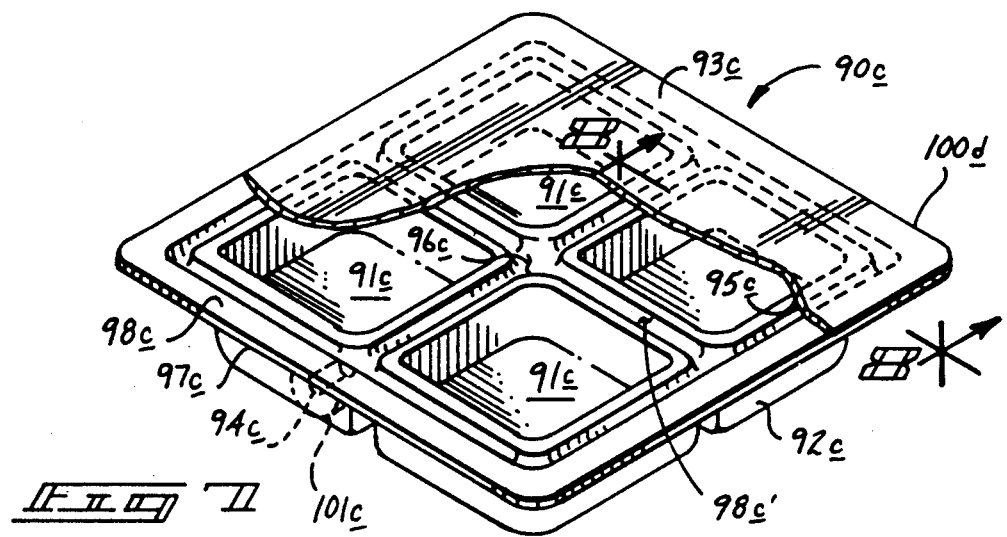
FIG. 7 is a pictorial view of a multi-compartment container embodying features of the present invention, portions of the container are removed.

FIGS. 7 and 8 are illustrative of a novel container member in a multiple compartment testable container 90c. This form of testable container includes a number of individual material receiving compartments 91c. They are illustrated a being formed in a first semirigid member 92c spanned by a common second or cover member 93c. Multiple compartment containers may also be formed consecutively in a linear array and in flexible bag configurations shown in FIGS. 9 and 10, or other container arrangements. Each compartment 91c in the illustrated configuration is circumscribed by a common test chamber 96c which is preferably formed as an integral channel, recess or indentation in one or both of the complementary container members, advantageously within the marginal edge portions 98c and common interconnecting web portions 98c. The test chamber 96c is outwardly adjacent the primary seals 95c provided about each of the individual compartments 91c. The test chamber 96c is also formed by overlapping portions of the second member 93c. Portions of the second member overlapping the test chamber recess may therefore be understood to comprise flap areas 99c as the term is used herein.

A testing fluid supply passage 94c may be provided in one or both of the container members, advantageously the first novel member, as shown in FIG. 7 by dashed lines. The first novel container member is adapted in such an alternative form to include a testing pressure supply fitting or boss 101c. The fluid passage 94c is in open fluid communication with the test chamber 96c and extends outwardly to a supply passage opening which is preferably flush with the peripheral edge 97c. Testing pressure supply passage 94c is provided to facilitate transfer of fluid to and from the test chamber 96c. A single fluid passage 94c may be used to transfer differential fluid pressure throughout the common test chamber 96c due to the interconnected nature of the chamber about the individual compartments. Thus a desired fluid pressure from a single source may be utilized for testing the integrity of several individual primary seals 95c for the several material receiving compartments 91c.

FIG. 12 is a fragmentary sectional view illustrating an alternative arrangement of a novel first container member 92d and a second member 93d to form a novel testable container 90d in which a primary seal 95d extends along a lip 98d between a material receiving compartment 91d. An important feature of the first novel container member 92d of this form is an integral test chamber 96d. The chamber 96d is advantageously formed in the first container member 92d. A secondary seal 100d is also provided outward of the integral test chamber 96d and inward of the container edge 97d. In the completed, sealed container 90d, the test chamber is spanned by the cover or second container part 93d.

Another important feature of the novel first container member 92d is a testing fluid pressure supply passage 94d. Passage 94d is provided as an axial opening through the first member 92d. The fluid passage 94d directly connects the outside environment with the enclosed area of the integral test chamber 96d. The fluid passageway 94d allows fluid communication to and from the test chamber 96d.

FIGS. 13, 14, 15, and 22 show several similar testable containers including novel container members having specific features which are similarly referenced except the postscript letters to the reference numerals are changed. Other more distinctive features will be described hereinafter. Container 90e of FIG. 13 includes an internal receiving compartment 91e which is advantageously formed in one of the container members such as the first member 92e. The compartment is spanned by a second container member or cover 93e. A primary seal 95e is situated along a marginal lip 98e between the first and second members 92e, 93e and extends from an inner seal edge adjacent the material receiving compartment 91e to an outward seal edge adjacent a test chamber 96e.

Container 90e includes an integral test chamber 96e formed in marginal portions of one of the container members, such as in lip 98e of the first member 92e. This version also includes a preformed open fluid passage 94e formed by one of the members and leading inward from the edge 97e to the test chamber 96e. Both chamber 96e and passage 94e are covered by the cover 93e.

Container 90e also advantageously includes a preformed secondary seal 100e inward of the outer peripheral edge 97e between the inwardly facing and containing secondary seal surfaces of the container members. Alternatively, the secondary seal may be temporarily formed by clamping selected marginal portions of the container members as shown using preferred apparatus described below.

FIG. 14 shows novel container members which together form a novel container 90f. A secondary seal 100f is situated inward of edge 97f and outward of the primary seal 95f to define a test area 96e between facing surfaces of the container members and the primary and secondary seals 95f, 100f. Container 90f includes peripheral flanges 101f and 101f' which are advantageously formed as extensions to the marginal edge portions of container members 93f and 92f, respectively. The flanges extend in opposite directions from the end of a test fluid passage 94f. Passage 94f is advantageously formed in the first container member 92f. It leads from the open outward end, inward to openly communicate with the test area 96e, outward of the primary seal 95f. A suitable testing pressure supply may mate with the container periphery at fluid communication fitting flanges 101f and 101f' to communicate a desired testing pressure through the passage 94f and within the test area 96f.

FIG. 15 shows a further embodiment container 90g similar to container 90f without the secondary seal 100f or peripheral flanges 101f and 101f' which form the fluid communication fitting for that container. Container 90g is shown being tested in a seal testing apparatus of this invention which is more fully described below.

FIG. 16 illustrates an alternative container variation 90i including a fluid passageway 94i that is formed through a first semirigid container member 92i. A preformed secondary seal 100i and primary seal 95i define a test area 96i, along with the first and second container members 92i, 93i.

FIG. 22 shows a still further alternative container 90p formed of at least one novel container member adapted for testing of seal integrity in accordance with this invention. Container 90p includes first and second container members 92p and 93p, respectively. The first body or container member 92p includes novel features in a marginal lip or flange 98p with substantially planar upper surfaces which mate in an overlapping relationship with the cover of second member 93p. An important feature along the upper surface of the body member flange 98p is a pressure supply passage 94p formed as a converging recess in the lip. The recess converges inwardly from an outer fluid supply opening at the peripheral edge of the container lip to the outer side of the primary seal area. An optional supply opening flange 101p similar to flange 101f can be provided to act as a fluid supply fitting or boss. Container 90p is drawn without a preformed secondary seal but such can alternatively be provided as suggested by container 90f in FIG. 14.

In FIGS. 15 and 22 an outward, preformed secondary seal is not provided initially with the container. Nor is an integral preformed test chamber found. Apparatus described below may be utilized to clamp the container members together outward of the primary seal to facilitate formation of the secondary seal and a testing fluid chamber. In such preferred embodiments an above atmospheric testing pressure is advantageously used and communicated through the supply passages 94g and 94p to force and deform the flexible container cover upwardly to thereby form a test area or chamber 96g as shown by dashed lines in FIG. 15.

Important features, as suggested above may be incorporated in either the first container member, the second container or cover member, or both. However, the examples shown to this point have included such novel features primarily in the first or base container member. FIGS. 18-20 are provided to exemplify similar novel features incorporated in the second or cover members, for aiding pressurization and testing seals when assembled (integrally or otherwise) with appropriate first container members to form complete, sealed containers.

The second container members may be formed as unsealed container member blanks, separately from the first container members, as where the second members are to form removable covers for single or multiple compartment bowls, cups, trays, etc. In such instances, the cover members may be formed of a selected appropriate material, the same as or different from the first container member. In fact, the second member may if desired be identical in all respects to the first member.

In bowl or cup configurations having single or multiple compartments the novel second or cover member may be relatively thin planar cover surface formed by a film or membrane such as a metallic foil having sufficient rigidity to take and hold specific forms in order to define and maintain a test chamber (FIG. 18) or test fluid passageway (FIG. 20) or both (FIG. 19) in an open condition for passage of test fluid therethrough.

Generally, the novel second or cover member will include a surface area adapted to span the compartment or compartments of a first container member. The cover member will also include an adjacent primary seal surface area adapted to receive or engage a mating part of a first member to form or enable formation of a primary container seal. The novel cover member will importantly include a test chamber surface, a test fluid passage surface, or both, located outward of the primary seal surface and leading toward an outward edge or rim.

FIGS. 18, 19, and 20 show further alternative novel sealed testable containers 90j, 90m, and 90n of this invention in which specific novel features are provided in the novel second or cover members. The second container members 93j, 93m, include preformed test chambers 96j, 96m respectively. Second container members 90m and 90n include respective integral fluid passageways 94m and 94n. FIG. 18 shows a novel container cover member 93j having an impressed channel forming a test chamber 96j. The open face of the channel is arranged inwardly facing to mate with the corresponding planar test chamber surfaces of the first container part 90j. This channel arrangement provides positive preformed flow areas about the container primary seal to thereby assure complete testing of that seal under either positive or negative gauge pressures of the testing fluid supplied thereto.

FIG. 19 shows container 90m having a container body portion 92m provided with a marginal flange which is annular and substantially planar. The novel complementary cover portion 93m is impressed or otherwise provided with a groove 96m' which forms the test chamber 96m inward of the cover edge or rim. A preformed pressure supply passage groove 94m' extends outward from an end opening into the test chamber groove 96m' to an end opening at the cover edge 97m or rim. The groove 96m' forms a supply passage 94m having with supply opening at the periphery of the container. A preformed secondary seal 100m is provided. The testing machine shown in FIG. 19 is described below.

FIG. 20 shows container 90n with a novel second container member 93n which is similar in construction to container 90j described above, but without a preformed groove to form a test chamber. Instead, a test area 96n is provided between first and secondary seals 95n, 100n and a preformed pressure supply passage groove 94n that opens into the test area 96n and leads to an open outward end at a peripheral edge 97n.

Some of the container and container member configurations described above include peripheral flange portions adjacent the peripheral edges. These peripheral flanges may be utilized by the purchaser for separation of the container members. Such flanges may also be utilized for testing purposes, providing surfaces against which a fluid supply means for delivering testing fluid of a desired pressure may be sealed or otherwise brought into proximity to provide for fluid communication to the test chamber.

It should be noted in the above examples of novel container members and complete, sealed containers, that the illustrated fluid passages and test chambers are exaggerated in size. The dimensions of the test chambers and fluid passages are preferably quite small, widths in the approximate range 0.04–0.40 inch (1–10 mm) are preferred. The depth and width of the indentations or recesses, for example need only be sufficient to allow a suitably pressurized fluid, preferably air, to pass during the testing procedures. A depth dimension of approximately 0.010 to 0.030 inches. A depth of approximately 0.020 inches is preferred.

The small test chambers are preferred to minimize the area against which the relatively higher pressures desired for use in this invention are applied. Also relevant is the fact that smaller volumes take less time to fill or void. Further, smaller groove dimensions do not demand excessive rigidity of the member forming the groove, due to the relatively small surface areas within the groove confronting the pressure differential. Thus, with the relatively confined, low volume test chambers and fluid passages formed in standard container materials, as suggested earlier, working test pressures in the area of 500 pounds per square inch are allowable without consequential damage to the adjacent surfaces of the container members.

At the more preferred positive working pressures discussed below, and with shallow, narrow passages and test chambers, application of pressure about the container seals is nearly instantaneous. Lower pressures from vacuum to 10 psi gauge are also useful, particularly when the fluid capacitance of the testing system is low. Thus the container members and containers incorporating the present improvements facilitate extremely fast, reliable testing of container seals with very little danger of container destruction as has been experienced with other existing containers and testing apparatus used for testing such containers.

Description now follows with regard to a preferred device 30 for use with conventional sealed containers to produce a differential pressure within a test chamber formed by the device adjacent to the container seal, outwardly contiguous with the primary seal and between the container members. The device produces a pressure differential within the test chamber by which leaks may be detected in the container through its primary seal. Various embodiments of pressure appliances and testing devices made in accordance with this invention are also disclosed for aiding in and testing seals in the novel testable containers exemplified above.

Figure 27:
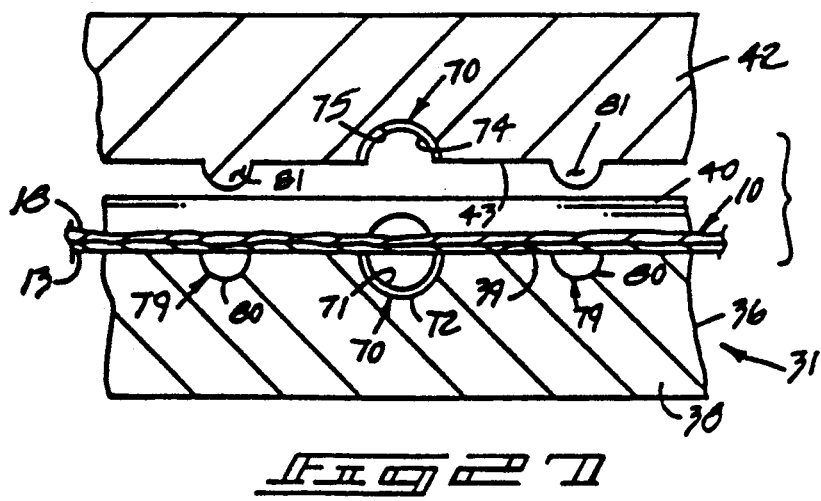
FIGS. 27–29 are sectional views taken respectively along lines 27—27, 28—28, and 29—29 from FIGS. 24–26.
Figure 28:
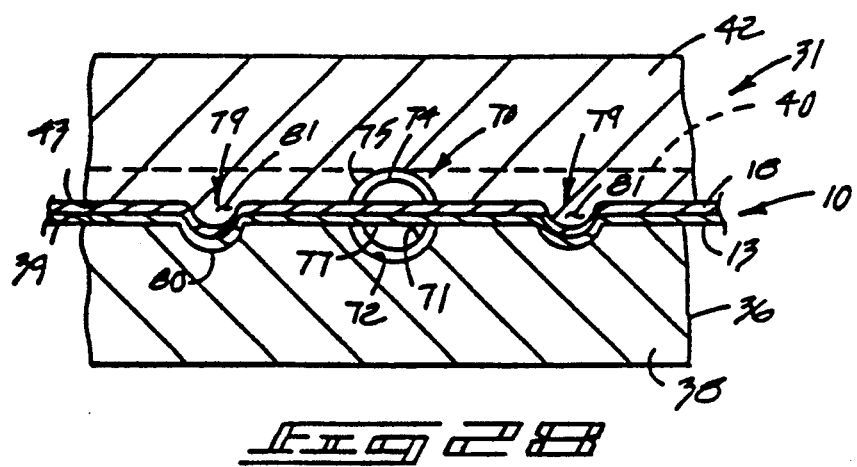
Figure 29:
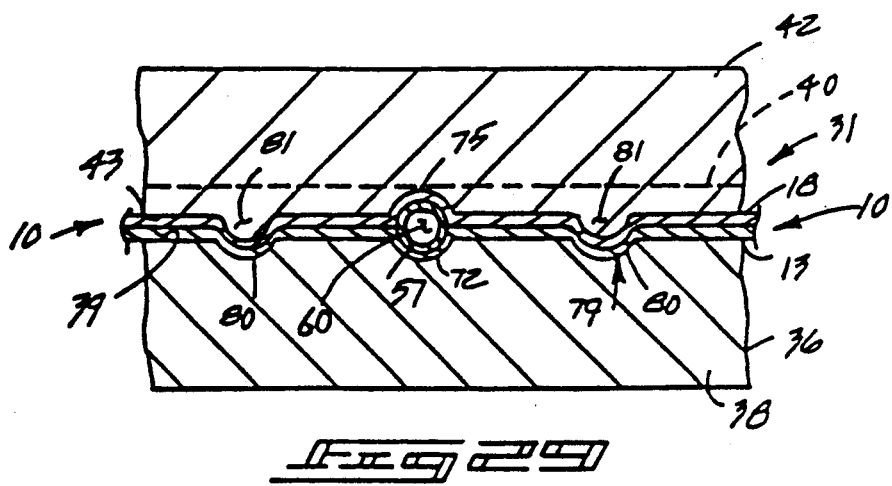

A first preferred testing device 30 is generally indicated in FIG. 23 of the drawings. FIGS. 24-26 graphically indicate operation of the first preferred form thereof. FIGS. 27-29 graphically indicate operation of a variation of the preferred apparatus 30. Other apparatuses for testing novel containers, such as described above, are shown in FIGS. 8, 15, 19, 20 and 30-46.

Test device 30 in FIG. 23 includes a seal forming means 31 for temporarily securing a secondary seal 28 along a container outward of its primary seal. Test apparatus 30 also includes testing fluid or pressure supply or delivery head 32 for delivering a testing fluid at a desired testing pressure. Also preferably included is a testing fluid supply passage forming means which is advantageously embodied as a probe 57 for opening a fluid passage into the formed test chamber 27.

More specifically, in the first form of device 30 shown in FIG. 23, seal forming means 31 for forming the secondary seal 28 is provided on a frame 35. Frame 35 includes a base plate 36 which can be configured as shown to function as a container support means upon which containers being tested are held. Alternatively, base plate 36 or other parts of the frame may be adapted as a functioning support surface for a container transport or handling apparatus (not shown), such as would be used in an automated food processing line. For example, the frame 35 could be situated along a conveying device to facilitate testing of successive containers as they are moved from one location to another.

Base plate 36 includes a contoured container support surface 37 for receiving bag type containers of the type shown in FIG. 1. A detector means 34 is advantageously mounted to the frame upwardly adjacent to the support surface 37. The detector means may be one of many conventional forms of sensors well known in the art for detecting proximity, displacement or movement of container member 17 responsive to test procedures described below.

Base plate 36 functions as a first container clamping head and is provided with an integral or attached clamping jaw, such as in the form of clamp plate portion 38 adjacent to frame 35. The clamp plate 38 includes a clamp surface 39 for engaging the bottom surface 15 of the container first container member 12. A guide and stop 40 may be provided along the first clamp plate 38 to assist in positioning the outward edges 16, 21 of the container for test purposes.

Seal forming means 31 for securing the secondary container seal also preferably includes a second clamping head or clamp plate 42. The second clamp plate 42 is movably mounted on frame 35 and includes a clamping surface 43 for selectively engaging the top surface 20 of the second container member flap 18. The second clamp plate 42 may include an alignment groove 45 for releasably receiving the guide or stop 40 as shown in FIGS. 25 and 26.

Second clamp plate 42 advantageously includes slides 46 at opposite ends that are slidably received over upright guide rods 47 of frame 35. The guide rods 47 are joined at upward ends by a cross head 48. A clamping actuator means is provided in the form of an extendible and contractible fluid powered ram 50. Ram 50 includes a cylinder 51 and rod 52 connected to an internal piston as is well-known. Cylinder 51 is pivotably connected to the cross head 48 and rod 52 is pivotally connected to second clamping head 42. Clamping head actuator 50 or similar means function to open or close the clamping jaw portions of the two clamping heads. As shown ram 50 is connected for moving the second clamp plate toward and away from the first clamp plate 38. Fluid pressure lines 53 extend from the cylinder to a control device 54 for supplying pneumatic pressure to appropriate ends of the cylinder to provide the desired contractional or extensional motion of the ram.

The testing pressure delivery head 32 includes means for transmitting fluid at a desired testing pressure to the container being tested for developing the desired pressure in the test chamber 27. Suitable testing pressures produce a differential pressure across the primary seals being tested to thereby force fluid through any leak present in the seal. Pressure delivery means 32 advantageously incorporates the passage forming means which is shown in the form of a probe 57 which is most clearly shown in FIGS. 24-26. Probe 57 is advantageously provided in the shape of a substantially hollow needle having a pointed distal end 58. The probe also includes an open fluid passageway 60 which may be formed as a hollow bore within the needle. The distal or insertion end of the probe includes a probe passageway opening adjacent the pointed end 58 to form a discharge aperture for emitting pressurized testing fluid and receiving fluid when vacuum is applied. Fluid is similarly communicated through probe passage 60 as the desired testing pressure requires.

Probe 57 is preferably mounted to a probe positioning actuator or drive means 62 for moving the probe to penetrate toward or into the test chamber and thereby open a testing fluid passageway to the container test chamber. The probe positioning or drive means 62 may be provided in the form of a fluid powered ram 63 with a movable rod 63a connected to the probe for controllably moving the probe and impressing it into and through a suitable marginal edge portion of the container being tested. In testing device 30 the probe is mounted for lateral insertion between the container parts through the secondary seal of the container and into fluid communication with the test chamber to allow fluid to flow through the fluid passage and thereby achieve the desired testing pressure. The cylinder 63 is mounted to frame 35 and connected to probe 57 to move the probe in substantially translational motions inwardly and outwardly relative to the container 10. An air or other gas compressor, vacuum pump or other suitable means for supplying pneumatic or hydraulic pressure is connected via cylinder pressure lines 68 to the cylinder 63 via control 54. The pressure source and control system thus function as a controllable pressure source or pressure supply means for actuating the cylinder 63 to cause translational motion of the probe.

As shown, control system 54 is manually operated with independent control valves well-known in the art for controlling the operation of both the pressure delivery ram 63 and the clamping head actuation ram 50. FIG. 47 shows an alternative pressure source and control system which can be used in the testing machine of FIG. 23 and other systems according to this invention. Alternative control system 400 uses a compressor 55 which supplies air, nitrogen or other suitable fluid. Gases are preferred for use as a testing fluid because of the faster operational capabilities and lower potential for product contamination. Air is most preferred because of the low cost and its ability to provide all three types of fluid needed for the testing system. The output from compressor 55 is supplied to a reservoir preferably included to provide a consistent supply. The pressurized fluid in reservoir 402 is connected by suitable piping to three independent pressure regulation valves 411, 412 and 413 which supply air for the testing head actuator 50, probe or other passage forming drive means 62, and the testing fluid source for delivery to probe 57 or other means for delivering the testing fluid to the container test chamber, respectively. The flow of fluid to the testing head actuation cylinder 51 is controlled by a suitable control valve arrangement such as the three way solenoid operated control valve 421 shown in FIG. 47. The three way control valve controls actuation fluid to the testing head cylinder by providing pressure to one or the other end of the cylinder to extend or retract the actuator in the well known fashion. A similar or equivalent arrangement can be used to drive the probe actuator 62 or other driver for the fluid delivery device. As shown a solenoid operated three way control valve 422 similar to 421 is connected to receive pressurized fluid from pressure regulator 412 and control operation of the probe driver to extend or retract the probe in the fashion explained elsewhere in this specification.

The testing fluid pressure regulator 413 supplies suitably pressurized testing fluid to a testing pressure delivery control valve 423. The downstream side of this control valve is connected to the probe passage such as through supply line 56 shown in FIG. 23.

Control system 400 also preferably includes a computer controller 440 which has control valve output signal lines 441, 442 and 443 for directly or indirectly controlling the operation of control valves 421, 422 and 423, respectively. Controller 440 can be of a variety of different types of electronic controllers known in the art. Controller 440 can also be connected to the detector 34 to process information concerning the acceptability of the container being tested. Controller 440 can further be connected to an automated processing line for handling the containers or an interface unit 450 for allowing such coordination between the testing machine and container handling system operating therewith.

A compressor, vacuum pump or other suitable testing fluid source 55 is advantageously provided for providing fluid of a desired testing pressure to probe 57 for communication through the probe passageway and into the test chamber 27 of container 10. The applied test pressure thus produces a desired pressure differential across the primary seal being tested. The testing fluid source 55 is connected to the probe by a testing fluid delivery line 56.

FIGS. 24-26 further show that probe 57 is slidably received within a probe guide such as probe guideway 70. Probe guideway 70 is advantageously provided in the form of first and second recesses 71 and 74 in the first and second clamping heads 38 and 42, respectively. The first probe guide recess 71 guides a lower half of the probe 57 and acts as a rest. The second recess 74 slidably receives and guides the upper portions of the probe when the second clamping head is extended into engagement with the container and first clamping head. The two guide recesses 71, 74 are preferably positioned on the clamping heads and relative to the container clamping jaw portions to slidably position the probe with the pointed end 58 thereof situated along the plane of the secondary seal 28. This relationship is best shown in FIG. 25. The probe point 58 is therein shown to be coplanar with the contacting plane of the joined first and second container member lip 13 and flap 18, respectively. The point 58 is thereby positioned to engage and deform at least one and preferably both container members from the outward edge thereof as the probe drive means 62 is actuated to move the probe inwardly from the position shown in FIG. 25 to the position between the surfaces 18 and 13 as shown in FIGS. 26 and 29.

The first recess 71 (FIG. 27) includes an expansion section 72 that includes a slightly larger radius or concavity for receiving the first container member portions adjacent thereto. Likewise, the second recess 74 includes a second expansion section 75 of increased radius for receiving the flap 18 of the second container member. The configuration of the expansion sections 72 and 75 are such that the second container member flap 18 and lip 13 will form themselves securely against the surfaces defining these recesses as the probe 57 is inserted. This condition is illustrated in FIGS. 26 and 29. The probe is therein shown after spreading the lip 13 and flap 18 outwardly into the recessed expansion sections 72 and 75. The probe 57 tightly compresses the engaged container lip 13 and flap 18 against surfaces of the sections 72 and 75 to effectively seal the container against the probe 57.

It is preferred that the probe 57 of the first preferred embodiment be substantially cylindrical in cross-section as indicated in FIG. 29. The recess sections 72, 75 are thus semi cylindrical to slidably receive the probe. The sections 72, 75 are arranged so the longitudinal axis of the probe is positioned substantially coplanar with the plane of the secondary seal 28 as indicated in FIG. 25. The semi-cylindrical recesses 71 and 74 together form a substantially cylindrical bore 77 when clamping head are moved together. The bore configuration 77 is best understood with reference to FIG. 28.

A marginal edge portion tightening means 79 is advantageously provided for engaging and pulling the container members taut across the recesses 72 and 74 when containers utilize substantially flexible first and second container members. Margin tightener 79 may be provided in the form of mating indentations 80 and ridges or projections 81 on the container engaging jaw portions of the first and second clamping heads 38 and 42. Ridges 81 press the engaged first container lip 13 and second container flap 18 into the indentations 80 and thereby stretch the container members tightly across the recesses 71 and 74. This assures accurate positioning of the mating surfaces 14, 19 respectively of the first container member 12 and flap 18. Precise positioning of the joining surfaces along a plane containing the central axis of the probe 57 facilitates insertion of the probe between the two contacting surfaces of the container margins.

Figure 30:
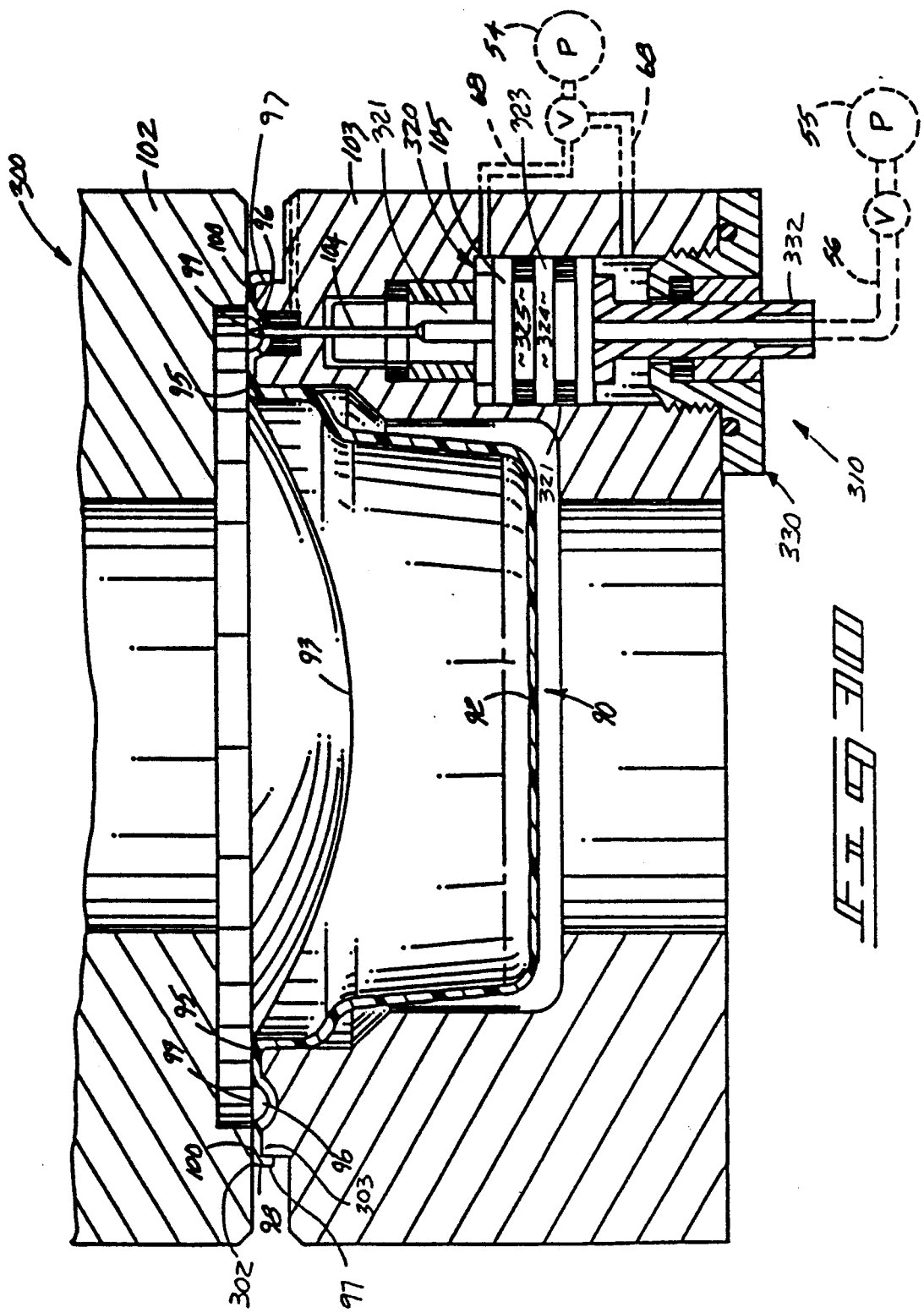
FIG. 30 is a sectional view showing a preferred testing head assembly and container support configuration, and further showing a preferred probe and probe actuator arrangement for use in testing containers, including container variations having a defined test chamber as illustrated, for example, in FIGS. 3 and 4.

FIG. 30 shows the testing head portions of an alternative testing device 300 in accordance with the present invention. Testing device 300 includes two clamping head members 102, 103 which are specifically adapted to receive annularly shaped containers such as shown in FIG. 3. The first and second clamping heads 103 and 102, respectively, are movably mounted relative to one another by an apparatus substantially similar to that shown in FIG. 23 and described above, or other alternative frame and testing head actuator assemblies adapted to engage containers supported on a suitable container support system. The circularly annular second clamping head 102 may be substituted for the second clamping plate 42 and the circularly annular clamping head 103 may be substituted for the first clamp plate 38. The annular clamping heads 102, 103 come together along opposing annular container engaging jaw faces 302 and 303, respectively, to produce or reinforce the annular secondary seal 100. The test chamber 96 is thus formed as a test annulus about the entire outer perimeter of the primary seal 95.

The first clamp head 103 is preferably provided with another novel passage forming means for producing a testing fluid communication passage into marginal edge portions of the containers being tested. The passage forming means 310 includes a vertically oriented probe 104 and a probe actuator 105 for forming the testing fluid passage and injecting suitably pressurized testing fluid (or vacuum) into the test chamber 96 for testing the primary seal 95 of the first novel container form 90.

The vertical probe 104 is substantially similar to the probe 57, except that it is mounted to clamp member 103 along with probe actuator 105. Probe 104 is preferably hollow and includes a pointed end situated by clamp 103 to facilitate piercing into the test chamber 96 by operation of the actuator 105. Pressurized fluid can then be delivered through the hollow probe and into the test chamber 96 to act against the annular seal 95.

The probe actuator is received within a probe actuator cavity 320 which has a barrel portion 321. The barrel portion is preferably cylindrical or otherwise constructed to allow slidable travel of the probe assembly. The actuator 105 includes a piston portion 323 with concentric ring portions 324 separated by recessed portions 325. A gland member 330 is threadably connected to the testing head and is adapted to slidably receive a tail portion 332 of the probe actuator assembly. Tail portion 332 is connected via line 56 to a suitable source 55 of testing fluid. Actuator 105 is moveable by supplying pressure to the upper or lower ends of the actuator piston.

Alternatively, probe 104 can be held stationary in the clamping head member 103 in an extended position. The pointed end would then project as shown in FIG. 30 to pierce the first member 92 as the clamp members 102, 103 are moved together. The clamp drive mechanism would thus function as drive means for inserting the probe into the test chamber to form a fluid passage.

Figure 31:
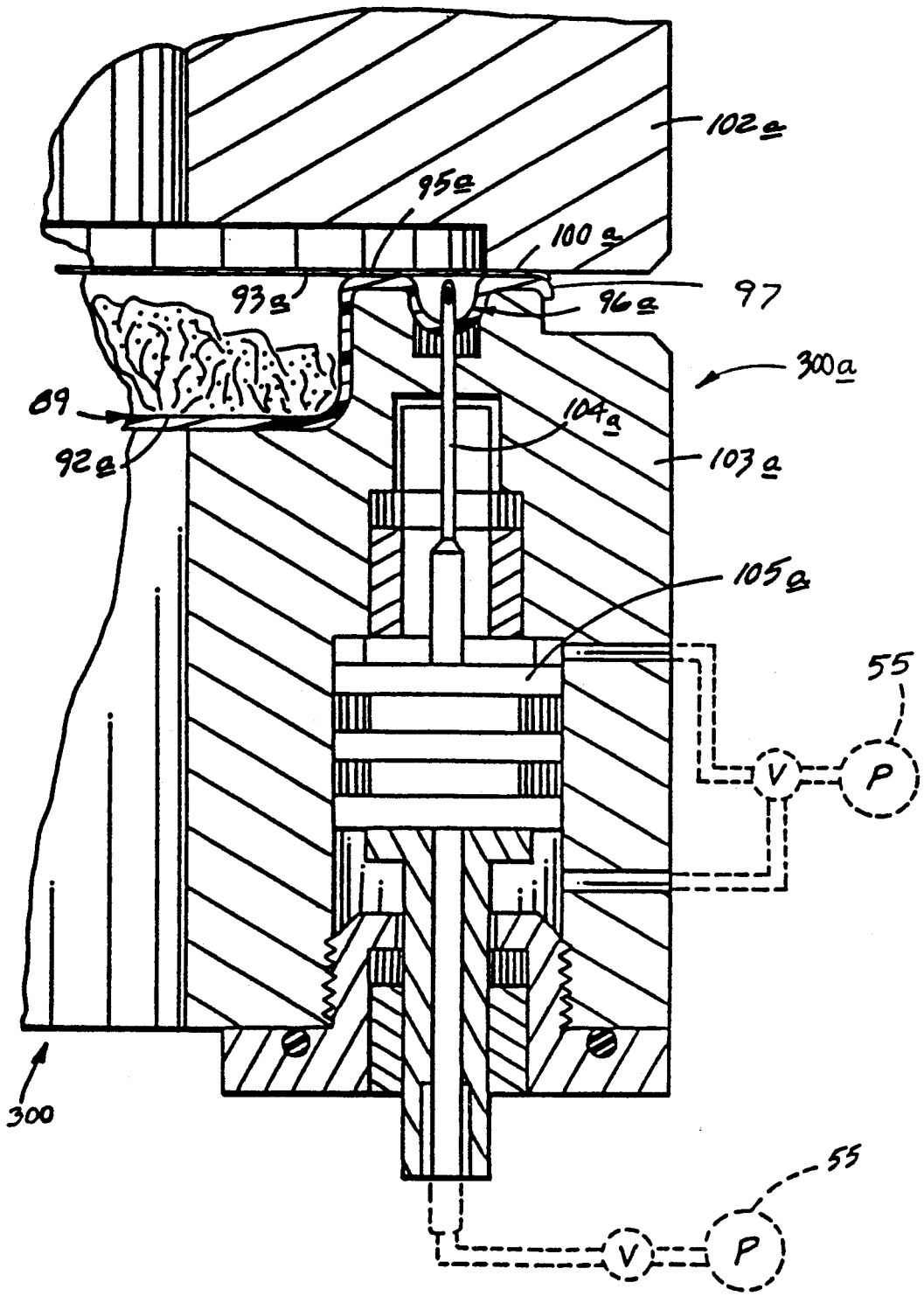
FIG. 31 is an enlarged fragmentary sectional view of a further embodiment testing apparatus showing a probe and actuator similar to that shown in FIG. 30 in greater detail, useful for testing containers such as shown in FIG. 5.

An alternative embodiment testing apparatus 200a shown in FIG. 31 includes two clamp members 102a, 103a along with a vertical probe 104a and a probe actuator 105a for testing the primary seal 95a of container 89 which was described above and in FIG. 5. The testing apparatus 200a differs from testing apparatus 300 of FIG. 30 in that the lower container supporting and clamping member 103a is specially adapted to provide support for container 89 not only along the marginal lip but also across at least part of the bottom surfaces of the container's first or base member 92a. The container supporting and clamping members 102a and 103a may be movably mounted relative to one another by an apparatus substantially identical to that shown in FIG. 23 and described above. The clamp members 102a and 103a may simply be substituted for similar clamp plates 42 and 38 of the first described apparatus. The vertical probe 104a is substantially identical to probe 104 described above. Actuator 105a is also substantially identical to the actuator 105 shown in FIG. 30 and described above. A stationary probe configuration could also be utilized in this embodiment to facilitate piercing of the first container member 92a responsive to movement of the clamp members 102a and 103a together.

FIG. 8 shows another container seal testing device 110 used for testing multiple peripheral seals 95c of the novel multiple compartment container 90c shown in FIG. 7 or conventional multiple compartment containers (not shown). Testing device 110 makes use of a pair of container support and clamping members 111, 112 with container engaging jaw portions 112a and 113a that are advantageously used to secure a secondary seal 100c outward of the several primary container seals 95c and about the perimeter of the entire container. The secondary seal 100c is also situated outwardly of the test chamber 96c that is common to all of the material receiving compartments 91c. Clamp members 111, 112 may be produced to conform to whatever configuration taken by the containers 90c. Thus, the clamps may include a circular, rectangular, or other perimeter shape to conform to the container shape shown in FIG. 7, or other container configurations depending upon the nature of the containers to be tested.

As with other variations shown, the device 110 includes a testing pressure delivery head 113 and a passage forming probe 114 with an internal fluid passageway for transmitting suitably pressurized fluid therethrough. A passage forming drive means 115 such as a pneumatic cylinder as described above may be used to force the probe into the test chamber and connect the probe fluid passageway with the test chamber. Testing device 110 also includes a testing pressure source such as described above for producing testing fluid at a desired testing pressure for communication to the integral test chamber 96c. Testing device may be used with multiple sensors (not shown), one for each compartment to detect leaks through any one or more of the primary seals 95c.

Figure 32:
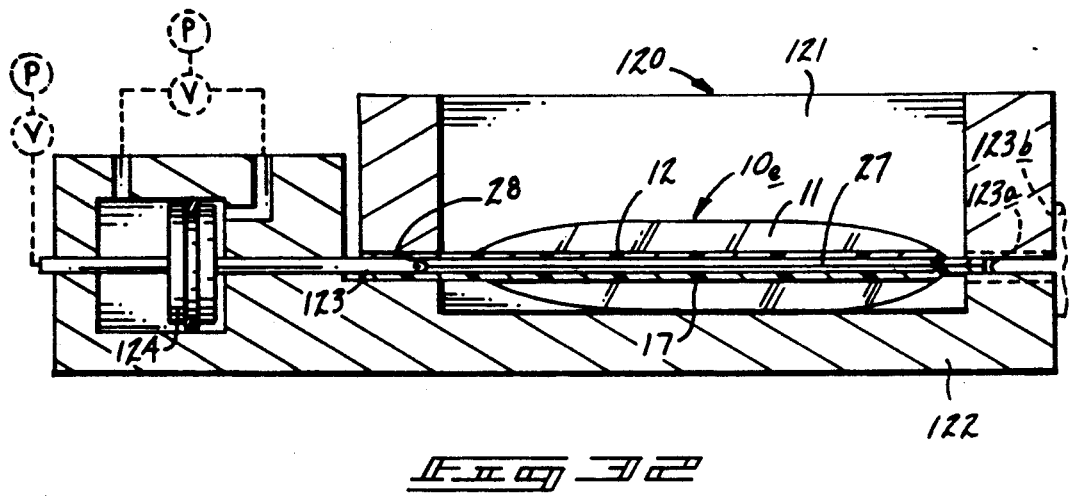
FIG. 32 is sectional view illustrating a test apparatus and procedure for testing bag configurations such as those illustrated in FIGS. 9-11.

FIG. 32 shows a further alternative testing apparatus 120 according to this invention. Testing apparatus 120 is constructed in a manner similar to the testing device 110 described above. Tester 120 is adapted for testing primary seals 23 of container 10e shown in FIG. 9. Seal tester 120 can alternatively be adapted to test other types of container, particularly bag type containers such as shown in FIG. 9 and referenced 10b–10d. The apparatus may be configured to test single individual bags, or may include appropriate dimensions to enable testing of multiple connected compartments as shown in FIG. 10 and the novel containers shown in FIG. 11 where the clamps may be used to secure a common test chamber about the multiple compartments as described for the device 110 described above.

FIG. 32 shows a pair of container support and clamping heads 121, 122 arranged similarly to the clamping heads shown in FIG. 23 and described above. A probe 123 and probe drive 124 are mounted adjacent to the lower testing head and adapted to extend into and form a test pressure communication passage into the formed test chamber 27 of the container being tested. The probe and probe drive are similar to those described above, and are also used to deliver suitably pressurized testing fluid to temporary test chambers 27 formed by the clamping heads 121, 123 between the preformed primary seal 23 and temporarily formed secondary seals.

Multiple probes (not shown) can also be used with bag containers such as 10d shown in FIG. 9 due to the existence of multiple unconnected primary seals 23. In such a situation, another probe 123a and drive 123b (shown by dashed lines in FIG. 32) similar to probe 123 and drive 124 would be provided to test the separate seal on the opposite side or end of the container. Only one probe and drive would be required for bag forms 10b, 10c, and 10e, since the primary seals of those bag configurations enable formation of common test chambers for penetration by a single probe.

Other variations using a probe as means for producing or opening a fluid passage are shown in FIGS. 36–38 and 42–46.

FIGS. 42–45 illustrate a further seal pressure appliance 130 made in accordance with the present invention. Seal pressure appliance 130 is conformed for use in applying pressure to single or multiple seals in novel container configurations such as shown in FIGS. 4 and 7, and conventional containers such as container 10. Appliance 130 includes a temporary seal forming means 131 for securing a secondary seal 134 between the container members of container 10, to thereby define a test chamber 132 bounded by the container primary seal 23, the secondary seal 134, and testing chamber areas along the mating surfaces of the container members which are situated between the primary seal 23 and the secondary seal 134.

Appliance 130 further includes passage forming means or probe 133 for producing an open fluid communication passage 136 into the test chamber 132. As shown, probe 133 is solid and does not include a probe passageway for injecting testing fluid directly into the test chamber of the container. A branch connection testing pressure delivery means 135 (FIG. 45) is provided for supplying testing fluid at a desired pressure through the open fluid passage 136.

The seal forming means 131 for securing the secondary seal is comprised of a first and second clamp members 137, 138. These clamp members may include a tertiary seal means 139 for producing a sealed supply chamber area 140 (FIG. 45) communicating with the fluid passage opening 136' and with the branched pressure delivery means 135 for producing the desired testing pressure.

Formation of the container test chamber 132 is aided by clamping the container outward of its primary seal. The test chamber is thereby formed by the outward secondary seal 134 and the inward, primary seal 23. Access to the test chamber area is gained by operating a probe drive means 141 to insert probe 133 between the separable container members from the outward container edge 21. The probe separates and forms the engaged container marginal portions into the configuration of complementary recesses in the jaw portions of the first and second clamping members. The formed passage 136 extends from the outward edge 21 of the container inwardly to an inner passage end which is in fluid communication with the test chamber 132.

After insertion of the probe, the probe drive means 141 is operated to retract the probe to the position shown in FIG. 45 thereby providing open access between the container fluid passage 136 and pressure delivery means 135. Appropriately pressurized testing fluid is communicated to the pressure delivery means via line 142. Line 142 is advantageously connected to the lower test head at an opening to an internal conduit which is formed within the testing head separate from the probe for delivering differential pressurized fluid to the formed fluid passage 136 in the container.

FIG. 46 illustrates a further passage forming and pressure delivery device 160 exemplifying the present invention. Device 160 is utilized for testing a novel container 90q having an integral performed test chamber 96q formed therein. Device 160 is also useful for testing containers such as illustrated in FIGS. 3, 4, 17 and 46. With this device 160, a first clamping member 161 and a second clamping member 162 move together to contract and compress the container edges and thereby secure a preformed secondary seal 163 outward of the container test chamber 96q. A substantially longitudinal or vertical solid probe 164 is moved by a drive means 165 to controllably reciprocate vertically between the retracted and extended positions shown by solid and dashed lines in FIG. 46, respectively. The probe or passage forming drive means 165 is utilized to drive the solid probe 164 through the engaged surface of the first container member 92q, thereby penetrating the marginal portions of the container member and forming a fluid passage 166 in the container communicating with the test chamber 96q. The probe is retracted once the passageway is formed in the container. A branch fluid passageway 167 is provided in the clamping member or test head in an arrangement providing fluid communication with the guide passage 168 for the probe 164. The probe 164 may therefore also function as a testing pressure delivery valve, allowing testing fluid pressure to be transmitted through the passageways 167 and 168 and onward through the container fluid passage 166 formed by the probe into the test chamber. Testing pressure transfer occurs as the probe is moved back to a sufficiently retracted position as shown in solid lines.

An "O" ring 170 is provided as a pressure delivery seal for sealing the bottom clamp member against the container to prevent escape of differentially pressurized testing fluid. The "O" ring is pressed firmly against the under surface of the first container member as the two clamp members come together. The "O" ring is centered on the longitudinal axis of movement for the probe so the probe will be slidably received through the inner confines of the "O" ring.

FIGS. 36–38 illustrate two related forms of apparatuses incorporating means for clamping and/or supporting containers, means for forming a fluid passage, and means for delivering testing fluid to a container test chamber. Reference should be made to FIGS. 37 and 38 which show a pressure appliance device 175 useful with conventional forms of containers in which the two container members are separable at the outer peripheral edges thereof. Device 175 and the device 190 of FIG. 36 are also useful with the present novel containers which include integrally preformed test chambers as indicated by dashed lines in FIGS. 37 and 38.

FIGS. 37 and 38 illustrate device 175 including opposed separable first and second clamp members 176, 177 as means for securing the container in position and for forming a secondary seal 178 between the container members 12, 17, outward of and spaced from the container primary seal 23. Members 176, 177 open and close similarly to the clamp members shown in FIGS. 42 and 43 thereby forming the secondary seal 178 between the contacting secondary seal surfaces of the container members. A test chamber 28 is thereby formed between the primary and secondary seals.

Device 175 further includes an inter-testing head, or clamping head seal means 181 for cooperating to produce the sealed clamping head pressure chamber 182 communicating with the testing fluid container passage opening and with the remaining parts of the pressure delivery means. The clamping head seal 181 may simply be comprised of a seal device such as a "O" ring (in annular clamping devices for testing containers having peripheral annular seals) or resilient seal member 183 mounted to either head for sealing engagement between the first and second clamp members. This seal, along with the container clamping jaw surfaces along the clamp members that clamp the container to produce the secondary seal 178, close the sealed area communicating with a differential pressure supply head 184 and the container fluid passage 180.

One of the clamp members, preferably the upper member 177, includes a channel or recess 185 (FIG. 37) formed within the clamp member for receiving and forming the engaged container member responsive to impression of a piloting probe 179 and application of positive fluid pressure. The passage forming means also includes a specially shaped probe 179 for forming a pilot passage partly through the secondary seal. Piloting probe 179 thus aids in producing an open fluid passage 180 (FIG. 38) opening into the test chamber 28 which is fully formed when pressurized fluid separates the container margins deforming them into the recess 185.

Probe 179, as shown in FIGS. 37 and 38, is solid with a shaped engagement end 186 that is complementary at least in part to the recess 185 configuration formed in the clamp member 177. The probe 179 is aligned with the recess 185 and is moved by probe drive means 187 for impressing the probe end 186 toward the container test chamber 28. The drive means may be a hydraulic or pneumatic cylinder arrangement as shown. The drive means 187 may be used in the solid probe version shown in FIGS. 37 and 38 to impress the probe end 186 between the separable edges of the container members which are forced apart, with one member being deformed into the aligned pilot or probe recess 185. The probe is then retracted leaving a pilot recess or opening between the container members, exposed to the pressure area 182. Differential pressure is then delivered to the area 182 between the secondary seal 178, and the clamping head seal means 181. The formed pilot part of the member 17, in recess 185 is then exposed to pressure delivered into the area 182 from outside the secondary seal. This pressure is used to drive the partially shaped member into the recess 185, shaping it to produce the fluid passage 180 leading into the test chamber 28. The delivered fluid will expand the test chamber as shown in FIG. 38 and act against the primary seal to complete the testing operation.

A related piloting probe device 190 is shown in FIG. 36. This embodiment includes first and second clamp members 191, 192 that move together to grip the container and form a secondary seal 193 between the first and second container members. However, the probe 194 in this version, includes an internal fluid passageway 195 for delivering differentially pressurized fluid from a pressure head 196 to complete the passageway initiated by the probe into the test chamber. The end 197 of the probe is shaped to engage and separate the edges of the container and, in this embodiment, to seal against the container. This is done responsive to operation of a drive means 198 for impressing the probe firmly between the container edges. A channel or recess 199 is provided in one of the clamp members to receive and form the container member surface engaged by the probe end 197. The internal fluid passageway 195 of the probe is aligned with the container fluid pilot passageway 200, formed partially by the probe and to be completed by application of pressure from the pressure head 196.

FIGS. 15, 19, 33-35, and 39 are illustrative of probeless container seal testing apparatus of the present invention. These variations are intended to test novel containers such as those shown in FIGS. 21 and 22 which have a preformed testing fluid supply passageway. The devices in these embodiments are utilized to secure a secondary seal outward of the primary container seal while allowing the formed passage to remain open. Fluid pressure differential is then applied through the open container testing fluid passage to act through an integral or formed test chamber against the outward edge of the container primary seal to effect the testing procedure.

FIG. 15 shows a testing device 210 for applying external differential pressure against the primary seal of container 90g described above. The device 210 basically includes means for forming and securing a secondary seal 209 such as a pair of separable annular first and second clamping jaw faces 288 and 289 provided upon contacting faces of the first and second testing head clamp members 211 and 212, respectively. Clamp members 211 and 212 are mounted for relative movement between contracted and retracted positions using a suitable frame and clamping action mechanism such as discussed above. The clamping action is used to secure the secondary seal 209 outward of the primary seal. The secondary seal is preferably secured inward of the outer open end 97g of the container fluid passageway 94g. The clamps thus secure the test chamber 96g between the first and second container members outwardly contiguous with the primary seal 95e, yet open to the container fluid passageway 94g.

Testing device 210 further includes a testing pressure delivery means generally shown at 212 which includes a testing head fluid entrance passageway 213 for transmitting suitably pressurized testing fluid therethrough. Passageway 213 is openly connected to the fluid communication passage 94g of the container. A testing head clamping or tertiary seal 215 is provided to produce a sealed testing head fluid supply plenum 216 communicating with the container fluid passage 94g and the fluid passageway 213 of the testing head when the clamp members come together. The seal is preferably comprised of a "O" ring or resilient gasket device as described above in connection with probe type variations of the present invention.

When the two clamp members 211 and 212 come together, the secondary seal 209 and tertiary seal 215 are secured. The volume of the plenum 216 between the secondary and tertiary seals is then capable of maintaining a desired testing pressure and communicating such to the container test chamber. The testing fluid pressure openly communicates with the test chamber through the integral preformed fluid passageway 94g formed in one or both of the container members.

Test device 210 can equally be utilized with the other containers such as shown in FIGS. 13, 14 and 19. These container variations may or may not include preformed secondary seals outward of test chambers or may utilize such secondary seals to help define a test chamber as indicated in FIG. 14. Simple variations of the present device well within the skill of the ordinary artisan, may be made to accommodate containers including the fluid passage and test chamber variations indicated.

FIG. 19 shows another novel testing device 210a which is substantially similar to testing device 210 just described. Similar components are similarly referenced with the additional postscript letter "a".

The above variations of testing devices do not incorporate a movable or stationary probe for forming a passageway into the test chamber area. It is noted, however, that the container fluid supply passage in these arrangements leads substantially outward from the inner end adjacent to the outward side of the primary seal. This facilitates fluid access by the testing device in a reliable, repeatable manner. The fluid access passage thus formed, will encourage separation of the container members in the test chamber area to complete formation of the test chamber upon reception of pressurized test fluid therethrough. This is due, at least in part, by the remote location of the fluid passage open end from the test chamber outward of the secondary seal.

FIGS. 40 and 41 show further testing head assemblies 220a and 220b adapted for testing sealed containers for leaks in the primary seals. As shown the testing heads are adapted for testing of annular containers but could alternatively be configured to test non-annular seals as indicated more specifically hereinabove. In the container variations shown tested by these testing devices the container fluid passages 94s and 94t are formed transversely through one or more of the container member marginal portions rather than laterally between the container members. Testing head device 220a of FIG. 40 includes appropriate clamping members 221a, 222a, one of which will include an internal testing head pressure supply passageway such as passageway 223a adapted for fluid communication with the container fluid passage 94s. The fluid passageway 223a advantageously includes a resilient container fluid passage sealing device such as an "O" ring 224a for sealing or reducing leakage of testing fluid. In FIG. 40, the seal 224a is indicated as engaging the first container member which includes an integrated, preformed container test chamber conduit formed therein. The relatively small diameter "O" ring 224a discussed above can alternatively be replaced with two larger concentric annular "O" rings which would also be represented in the same manner as shown in FIG. 40. Such an alternative would define an annular zone about the container marginal edges for applying the test pressure to the container testing fluid supply passage 94s without requiring that the passageway be precisely aligned with the respective testing head pressure supply passageways 223a, or 223b in FIG. 41.

The testing head assembly 220b shown in FIG. 41 is conceptually similar to that described immediately above with regard to FIG. 40. Similar reference numerals with a postscript "b" thus identify similar features in FIG. 41 as described above with respect to FIG. 40.

Figure 33:
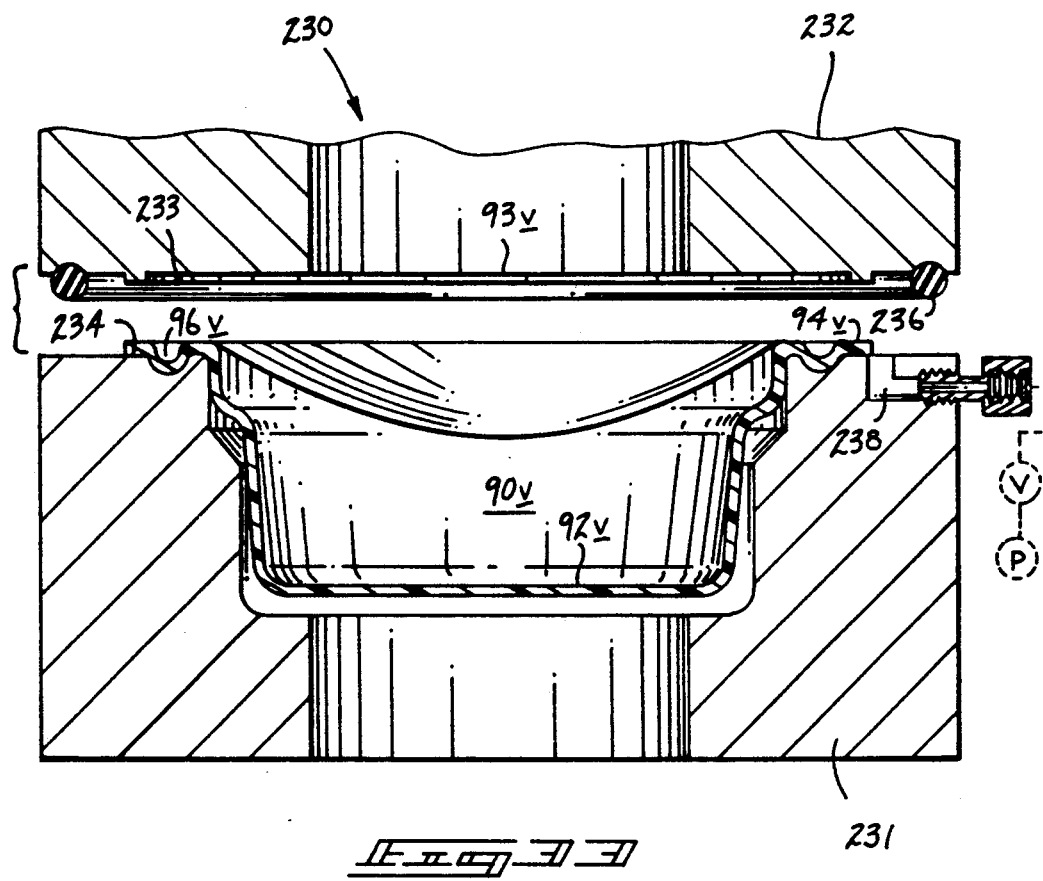

FIGS. 33-35 illustrate a testing head pressure appliance device 230 intended and adapted for use in testing operations with the novel configuration of container shown in FIG. 21 or variations thereof. This testing head is also similar to testing heads 210 and 210a indicated for testing containers as shown in FIGS. 15 and 19.

Specifically, the testing head 230 includes first and second clamp members 231, 232 that may be effectively moved relative to one another by suitable testing head positioning apparatus such as similar to those described above. The two clamp members include oppositely facing clamp surfaces 233, 234 for receiving a container 90v therebetween and securing an annular and circuitous secondary seal 235 (FIG. 34) along the container outward of its primary seal. The secondary seal 235 is formed or secured along the container such that the preformed radially oriented groove 94v in the marginal lip of first container part 92v functions as the container testing fluid communication passageway. Groove 94v is formed through the secondary seal 235.

This particular configuration also includes a testing head contacting face supply plenum or tertiary seal 236 which cooperates with the secondary seal forming surfaces or jaws of the clamping members, to form a sealed supply plenum chamber 237 (FIG. 35) openly communicating with the container fluid passageway 94v, and the source of differentially pressurized testing fluid. In this embodiment such fluid is delivered through a testing head supply passageway 238 preferably formed in one or the other of the clamping members. The differentially pressurized fluid communicates with the sealed plenum chamber and with the container test chamber 96v through provision of the container fluid passage 94v passing through the secondary seal and opening into the test chamber area.

While FIGS. 33 and 34 indicate testing of a bowl configuration container having a single material receiving compartment and peripheral seal, similar testing head devices can be altered to accommodate multiple bowl or bag configurations, or such container configurations having a finite length primary seal such as the bags or pouches shown in FIG. 9.

FIG. 39 exemplifies an embodiment 245 that is useful with containers of the type including integrally connected preformed peripheral testing pressure communication flanges 101r and 101r' extending opposite one another at the peripheral edge of the associated container 90r. Such flanges are separable from one another in the vicinity of an open end of the associated integral fluid passage 94r. However, such flanges may also be provided in containers without such an integral preformed passage, provided that the testing apparatus have provisions for forming the fluid passageway such as described above in the probe embodiment testing apparatus.

In the particular embodiment illustrated in FIG. 39, a secondary seal forming means is provided for securing a sufficiently fluid tight secondary seal between the container members to allow the desired testing pressure to be developed in the container test chamber 96r. Such means is, as described with various other embodiments above, preferably comprised of a pair of clamp members 246, 247. Such clamp members include appropriate clamping surfaces for engaging and securing the container on opposite sides to at least partially secure a secondary seal 248. This apparatus may also be utilized with containers including an integral secondary seal as shown in the containers of FIGS. 13 and 14.

Testing head 245 includes a differential pressure delivery or supply head 249 including a testing fluid delivery passageway 250 for transmission of differentially pressurized fluid therethrough. The pressure delivery head preferably includes an extendible and retractable delivery nozzle assembly 251. The nozzle assembly includes a contacting element or face piece 252 which is integrally attached to a drive rod 255 that includes central bore 250, forming the fluid delivery passageway. The contacting face piece 252 of the nozzle assembly includes a face seal 253 for restricting testing fluid leakage and preferably sealing against the container peripheral fluid communication flanges 101r and 101r'. A fluid powered controllable drive means is provided in the form of a drive piston 254 which is slidably positioned within a cylinder 258 formed in the first testing head 247. The nozzle 251 is thus held securely against the container flanges which in turn are firmly supported by adjacent container flange supporting portions of the clamping members 246, 247 to secure the delivery nozzle seal and maintain open communication between the pressure delivery head passageway of the container and the container fluid supply passageway.

The nozzle seal device 253 is preferably resilient to conform with the configuration of the engaged portions of the container flanges. The seal can therefore be sufficiently maintained simply by extending the nozzle laterally inward and applying inward directional forces against the nozzle to engage the seal against the container flanges 101r and 101r'. This sealing contact may be easily broken following testing procedures, simply by laterally retracting the nozzle through use of the nozzle drive means.

It should be understood that the above description of various container embodiments or variations of the sealed container testing devices are given to exemplify various forms the invention may take. The particular combinations shown in these embodiments are illustrative. Features of the variations shown may be utilized in many alternate combinations and configurations by interchanging one or more features with another and making suitable modification. Modifications and variations of the apparatus may also be utilized with appropriate variations of the container concepts shown herein.

The description given above described or alluded to many of the novel leak detectional testing and pressure application processes which form further aspects of the present invention. These novel processes and methods will now be more fully described to supplement the foregoing explanations.

Some of the preferred processes according to this invention are performed by the testing machine shown FIG. 23. Such processes will first be explained with reference to the embodiment of FIGS. 23 with reference to FIGS. 24–29 which more clearly illustrate some of the novel procedural steps employed. Additional novel processes according to this invention will also be described in relation to particular container or apparatus configurations, following the general process described below.

To begin the process, and with reference to FIG. 23, cylinder 51 is first contracted in order to retract the second testing head member 42 upwardly as shown in that Fig. This opening step separates the opposing testing head members 38, 42 to provide sufficient space therebetween to receive the lip 13 and flap 18 of container 10a being tested. The container is loaded onto the container supporting base 36 and arrange into a desired position within the contoured container support surface 37. In the desired testing position the container is positioned with the end marginal portions of the container between the clamps with the outward edges 16, 21 positioned flush against the guide or stop 40. The container can be loaded either manually, by mechanized equipment, or using automated container handling equipment known in the art and usually specific to the type of container being loaded (not shown).

With the container positioned on the container support, it is then possible to proceed with steps to hold the container and to secure or form a desired secondary seal in the container marginal portions. To accomplish this the testing head contraction and retraction cylinder 51 is actuated to extend the piston 52, thereby causing the clamp plate 42 to move downwardly. When the jaws of the clamping plate have contacted and compressed lip 13 tightly against the flap 18, then the combined clamping and seal forming steps are completed thereby forming the secondary seal 28. The clamping surfaces of the two clamp plates produce the secondary seal inward of the outer edges 16 and 21 and outward of the first or primary seal 23. With these steps, the test chamber 27 is defined between the primary or containment seal 23, the secondary or test chamber seal 28, the lip 13, and the flap 18.

As the two clamp plates come together, the marginal portion tightening means 79 also preferably functions to automatically engage and pull the relevant container portions taut across the container deformation recess means 70 (FIG. 28). This process substantially centers the contacting inner surfaces of the container parts along an interface plane between the lip and flap. The interface plane is preferably positioned in substantial alignment with the central axis or point axis of the passage forming means or probe 57.

With the clamp plates closed and the margins preferably aligned, the container is ready for formation of the desired testing pressure communication passage into the enclosed container test chamber 27. This is advantageously accomplished using probe 57 which is slidably held within the bore 77 formed by the first and second probe guideway recesses 71, 74. Probe drive means 62 is then actuated by supplying appropriate hydraulic or pneumatic pressure to the cylinder 62. This forces the probe inwardly in an insertion action between the contacting surfaces of the container margins to complete the step of producing a passageway communicating with the test chamber 27. The probe 57 is thus extended from the retracted position shown in FIG. 25 into an extended position with distal portions thereof and the opening of probe passage 60 in fluid communication with the test chamber as shown in FIG. 26. It is preferable for the probe to only be inserted into the formed test chamber and not into the primary seal 23.

As the probe is inserted between the container parts, the pointed end 58 separates the lip 13 and flap 18, forcing them apart and deforming them into the container margin expansion recess sections 72 and 75. The engaged container portions are pressed tightly by the probe against the walls of the recesses 72 and 75 substantially sealing the container against the inwardly sliding probe and against the recessed expansion sections 72 and 75.

Once the probe is positioned with probe passageway opening 60 within the test chamber 27, the step of forming a fluid passage into the test area is complete, as the passage 60 within the probe now openly communicates with the test area through the secondary seal 28 from the outer edge of the container. Pressurized fluid may be supplied via a pressure supply 55 provided in the control apparatus 54, to perform the step of producing a differential fluid pressure through the fluid passage.

Testing pressures ranging from 0 absolute pressure (vacuum) to 500 pounds per square inch (psi) gauge pressure are believed useful with most of the apparatuses and processes described herein. In some of the apparatuses and with some of the containers vacuum pressures are not as effective, for example, the testing device and methods described with respect to FIGS. 42–45. Testing pressures are more preferably positive, even more preferably in the approximate range 10–500 psi gauge, still more preferably approximately 30–500 psi gauge, and even still more preferable are pressures in the approximate range 50–500 psi gauge. At least some of the embodiments shown and described herein have been tested using approximate testing fluid pressures of 300 psi gauge.

Suitably pressurized testing fluid will fill the test chamber 27 and act against the outward edge of the seal 23. Pressures selected for use in this invention must create a differential pressure across the primary seal in order to provide a driving force for fluid transfer either into or out of the sealed internal container compartment. More preferably the testing pressures used will be positive as indicated above and any pin holes or leaks within the seal will allow fluid to pass into the material receiving compartment 11. Transfer into the internal compartment will cause a wall of the container to bulge thereby allowing detector means 34 to detect deflection caused by the leakage into the material receiving compartment 11.

The application of the differentially pressurized testing fluid to the test chamber 27 can alternatively produce other detectable effects on or to the containers being tested. Such effects should preferably be directly and selectively related to the existence of a leak in container seal 23 and the proper application of the testing pressure to the seal. Various types of acoustical, electrical, or optical sensors can alternatively perform the same function based on a different mode of action for sensing a manifestation associated with a leak through the seal 23.

The output signal from the detector means 34 can be analyzed and connected to a threshold sensing device (not shown) which triggers an alarm (not shown) or instructs automated processing equipment (also not shown) to divert the container into a reject conveyor system (also not shown).

The container 10a is removed from testing apparatus 30 after the detection phase of testing has been completed. Initially the testing pressure can advantageously be released, or alternatively, not be released as the particular production process indicates is most desirable. The probe actuation cylinder 63 is operated to retract the probe 57. Similarly, the testing head actuation cylinder 51 is contracted, thereby lifting the second clamp plate upwardly. This frees the container to be removed and simultaneously positions the apparatus for receiving the next container for testing.

The testing and pressure application processes used by the testing head 300 on container 90 as shown in FIG. 30 are similar to the processes just described for the apparatus shown in FIG. 23. Firstly, the testing head clamping members 102 and 103 are separated to facilitate installation of the container 90 therebetween and into the supported position shown in that FIG. The clamping members are then closed to clamp the container into a desired position and secure the secondary seal 100 about the test chamber 96. The probe actuator 105 is then controlled to move and insert vertical probe 104 transversely through the first container part, thus forming a fluid communication passage. Pressurized fluid is delivered by injecting the test fluid through the probe into the test chamber for testing the seal. The testing period using the novel apparatuses is typically a matter of seconds at the most. Testing resonance times of less than a second are known to be operable and expected to be normal with systems not requiring large fluid capacitances to be filled in order to charge the system and test chamber to the desired testing pressure. After the testing phase has been completed the testing head is opened by separating the testing head clamping members and the container is removed in any suitable manner.

Similar procedures may be utilized to test the primary seal of the alternate form of container 89 using testing apparatus 300a as indicated in FIG. 31.

In processes for testing and pressure application to containers not having a preformed testing fluid communication passageway leading to the container test chamber, a step of forming such a fluid passage in the container is included, such as describe above in connection with the operation of the testing device of FIG. 23. The invention thus includes method steps involving piercing of the container marginal portions to form a testing fluid communication passage and thereby allow fluid communication to the container test chamber. The piercing processes are advantageously performed through the base container member or the container member having a preformed channel which structurally defines the walls of the container test chamber.

The piercing of container margins to produce the fluid passage can occur using either a non-communicating or solid piercing probe such as shown in FIG. 46, or a fluid communicating injection type probe such as described with respect to the testing machine of FIG. 23. The delivery of testing pressure to the container test chamber with hollow or injection probes of the invention advantageously involves maintaining the injection probe in an extended injection position and injecting the testing pressure through the probe. Such processes are applicable to many container forms described herein, and are particularly applicable to containers not having a preformed test fluid communication passage and a preformed secondary seal in order to provide fluid communication into such a preformed and sealed test chamber.

Use of a passage forming probe not having a fluid delivery conduit in the probe typically involves supplying the testing fluid through a branch testing fluid delivery passageway such as passageway 142 in FIG. 45. In some of the preferred methods the passage forming probe performs an automatic controlling or valving function for controlling the delivery of testing pressure to the fluid passage of the container, such as described with respect to FIG. 46. Such methods of passage forming and testing can be used on a wide variety of containers such as described hereinabove.

Other novel method steps according to this invention also include forming a container fluid communication passage without necessarily piercing a marginal portion of the container. The operational description given of the machine of FIG. 23 is exemplary of novel processes which involve inserting a passage forming means such as a probe between adjacent container parts to either temporarily or with duration separating the container parts to provide a testing pressure communication passage. Such processes can advantageously be performed by laterally inserting a suitable probe between the adjacent or contacting container parts. The separating and inserting processes can also advantageously be performed in connection with a tensioning or tightening process for the marginal edges or other relevant container parts to facilitate the insertion of the passage forming means.

Novel methods for forming testing pressure communication passages in containers also include forming a pilot passage such as shown in FIG. 44 and then completing the formation of the passage by application of pressurized testing or other fluid to the pilot passage to cause the opening of the passage into fluid communication with the container test chamber as shown in FIG. 45. Such processes advantageously include deforming or distorting edge portions of the container into associated recesses in the testing head members adjacent to the pilot passage forming action. Such processes can be combined with the automatic valving of testing fluid for opening the pilot passage.

This invention also includes novel methods for applying testing pressure to containers and for testing container seals wherein the containers being tested are provided with at least one preformed testing pressure communication or supply passage such as exemplified by the container of FIG. 6 and many others shown and described herein. Such methods generally involve many of the same steps similar to those described above with respect to the operational description of the testing machine of FIG. 23. Such processes may further include engaging the container along marginal edge portions to form a testing pressure communication relationship capable of developing the desired testing pressure in the container test chamber. In some of the novel methods this is accomplished by engaging a preformed fluid communication fitting formed on the container, such as illustrated in FIG. 39. Such engaging and fluid communicating processes can advantageously be performed by movably extending a movable pressure delivery head preferably toward the container from a lateral orientation and adjacent the peripheral edges of the container margins. Alternatively, the engaging can be performed by mechanically sealing against preformed openings along structurally supporting members of the container which are capable of supporting and maintaining a sealing relationship. Such sealing and engaging can advantageously be performed along a preformed ridge or other structurally resistive portion of the container which also serves as a defining wall structure of the container test chamber. Such sealing advantageously can be performed against preformed fittings or bosses such as shown in the containers of FIGS. 6 and 7.

Novel pressurizing and leak testing methodologies according to this invention further include communicating suitably pressurized testing fluid through a preformed container testing fluid communication passage and along a preformed groove or channel formed in at least one of the container part marginal portions to achieve fluid communication therealong and differential pressure development across the primary seal being tested.

Still further novel process steps of this invention include communicating positively pressurized testing fluid through a preformed testing fluid communication passage to an area, such as an annular area existing between two defined seals, and thereby cause deformation of the adjacent container marginal portions to thereby form a testing chamber between marginal portions of the container. Such processes can advantageously be accomplished using containers having both a preformed testing fluid communication opening and a preformed secondary seal. The preformed secondary seal and preformed primary seal which is being tested thus provide a preformed test chamber area therebetween for distorting, deforming or otherwise expandably changing to form the container test chamber upon the applying of positively pressurized testing fluid to the preformed fluid passage. Such processes can advantageously be performed by applying the pressurized testing fluid through fluid passages which are preformed laterally along the interior surfaces of a marginal portion of at least one container part to allow the testing fluid to flow laterally inward or radially inward to pressurize the test chamber.

Additional novel process steps according to this invention for pressurizing and testing sealed containers with preformed openings also include sealably engaging the first and second testing head members along a testing head seal, such as a tertiary seal 215 shown in FIG. 15. Sealing of the testing head members preferably occurs outwardly from the container periphery and secondary container seal. Further steps include forming or securing the secondary seal along the container. Further included is the step or steps of forming an enclosed testing fluid delivery plenum adjacent to the container testing fluid communication passage opening or openings. This step is completed to define an volume or void between the secondary and tertiary or testing head seals that are common to the container fluid passage and to the source of differential pressure in order to effectuate delivery of testing pressure to the container. The methods further include thereafter pressurizing the plenum chamber to cause communication of testing pressure through the container fluid communication passage and within the test chamber of the container. Alternative methods of this invention include forming such a fluid delivery plenum against localized portions of the marginal portions of the container and adjacent to the opening(s) of the fluid communication passage for the container.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

We claim:

1. A process for nondestructively testing a sealed container to detect for any leaks existing in at least one preformed primary seal which connects at least two parts of the container in sealed relationship, said primary seal serving to seal an internal compartment enclosed by the sealed container, said primary seal having an inward side toward said internal compartment and an outward side opposite to said inward side, said outward side being connected to marginal edge portions of the container parts; said primary seal serving to maintain a seal thereacross between the inward and outward sides thereof, the process comprising:

creating a substantially sealed test chamber adjacent the outward side of the primary seal and which is in fluid communication therewith; said test chamber being substantially enclosed and defined between marginal edge portions of the container parts which are outwardly of said primary seal;

forming at least one of the marginal edge portions of the container to include at least one testing fluid supply passage which is capable of communicating a desired testing pressure to the test chamber by engaging and deforming marginal edge portions of the container with an injection probe to form said testing fluid supply passage, and positioning at least part of the injection probe between said container parts;

producing a desired testing pressure within the test chamber and against the primary seal to develop a differential pressure across the primary seal and cause transfer of fluid through any leaks in the primary seal, by communicating fluid through an injection passage in said injection probe;

detecting a change in the container which is selectively associated with transfer of fluid through any leaks in the primary seal; and said forming being accomplished by laterally engaging and deforming marginal edge portions of the container with said injection probe by slidably and laterally passing the injection probe between the marginal edge portions of the conjoined first and second parts of the sealed container to form said testing fluid supply passage.

2. A process according to claim 1 wherein said forming is accomplished by inserting the injection probe through a secondary seal formed outwardly from said primary seal; said secondary seal serving to at least partially define the test chamber.

3. A process according to claim 1 wherein said creating step is accomplished by clamping the marginal edge portions of the container between clamping means to form a secondary seal at positions spaced from the primary seal to thereby restrict leakage from the test chamber.

4. A process for nondestructively testing a sealed container to detect for any leaks existing in at least one performed primary seal which connects at least two parts of the container in sealed relationship, said primary seal serving to seal an internal compartment enclosed by the sealed container, said primary seal having an inward side toward said internal compartment and an outward side opposite to said inward side, said outward side being connected to marginal edge portions of the container parts; said primary seal serving to maintain a seal thereacross between the inward and outward sides thereof, the process comprising:

creating a substantially sealed test chamber adjacent the outward side of the primary seal and which is in fluid communication therewith;

said test chamber being substantially enclosed and defined between marginal edge portions of the container parts which are outwardly of said primary seal;

forming at least one of the marginal edge portions of the container to include at least one testing fluid supply passage which is capable of communicating a desired testing pressure to the test chamber by inserting a passage forming means through a secondary seal formed outwardly from said primary seal; said secondary seal serving to at least partially define the test chamber;

producing a desired testing pressure within the test chamber and against the primary seal to develop a differential pressure across the primary seal and cause transfer of fluid through any leaks in the primary seal; and detecting a change in the container which is selectively associated with transfer of fluid through any leaks in the primary seal.

5. A process according to claim 4 and further defined by said forming being accomplished by engaging at least one passage forming means with the marginal edge portions of the container to form said testing fluid supply passage by deforming at least one part of said container.

6. A process according to claim 4 and further defined by said forming being accomplished by piercing one of the marginal edge portions of the container with at least one passage forming means to form said testing fluid supply passage.

7. A process according to claim 4 and further defined by said forming being accomplished by engaging and deforming marginal edge portions of the container with an injection probe to form said testing fluid supply passage, and positioning at least part of the injection probe between said container parts, and wherein said producing step is accomplished by communicating fluid through an injection passage in said injection probe.

8. A process according to claim 4 wherein said creating step is accomplished by clamping the marginal edge portions of the container between clamping means to form a secondary seal at positions spaced from the primary seal to thereby restrict leakage from the test chamber.

9. In a seal testing process for applying a differential pressure across a primary seal of a container, wherein the container includes a material receiving compartment situated inward of the primary seal, a first container member, a second container member extending outward of the primary seal to an outward side thereof, and a secondary seal outward of the primary seal; the steps comprising:

establishing an external sealed test chamber along the primary seal to the outward side thereof between the container members;

forming a testing fluid supply passage leading into the test chamber;

producing a desired testing pressure within the test chamber by fluid communication through the testing fluid supply passage and against the outward side of the primary seal such that a desired differential pressure is created across the primary seal so that fluid seepage will occur through any leak present within the primary seal, by:

clamping the container members together to secure the secondary seal outward of the test chamber;

wherein the step of forming a testing fluid supply passage is accomplished by inserting a probe, having a fluid passageway formed therein and a probe opening adjacent an insertion end thereof, between the clamped container members and toward the primary seal through the secondary seal to locate the probe opening within the test chamber; and transferring fluid through the fluid passageway within the probe to produce the desired testing pressure within the test chamber.

10. A process according to claim 9 wherein the step of producing a desired testing pressure within the test chamber is accomplished by transferring fluid under pressures up to 500 psi gauge into the test chamber.

11. A process according to claim 9 wherein the probe is pointed and the step of forming a testing fluid supply passage is accomplished by impressing the pointed probe between adjoining surfaces of the container members, to separate the container members.

12. A process according to claim 9 wherein the probe is pointed and the step of securing a secondary seal by clamping the container members together is accomplished by moving independently movable clamp members and wherein at least one of the clamp members includes a channel formed therein for receiving the pointed probe therethrough to allow deformation of at least one of the container members into the channel thereby forming the testing fluid supply passage.

13. A process according to claim 9 and comprising the further steps of:

securing a tertiary seal outward of the secondary seal to define an area between the secondary seal and tertiary seal for receiving differentially pressurized fluid; and producing the fluid passage along at least one of the container members for transmission of differentially pressurized fluid from the area between the secondary and tertiary seals into the test chamber.

14. A process according to claim 9 and comprising the further steps of:

securing a tertiary seal against marginal edge portions of at least one of the container members to define a testing fluid supply passage between the secondary seal and tertiary seal for transferring the desired testing pressure to the test chamber.

15. A process according to claim 14 wherein the step of forming a testing fluid supply passage is accomplished by:

placing the probe between the container members to form a recess defining the fluid passage leading toward the test chamber in at least one of the container members; and withdrawing the probe from between the container members leaving said testing fluid supply passage open by communicating with the area between the secondary and tertiary seals.

16. An apparatus for nondestructively testing a sealed container to detect for leaks existing in at least one preformed primary seal which connects at least two parts of the container in sealed relationship, and in which one part of the container is a base and includes a preformed test chamber groove, said primary seal serving to at least partially seal an internal compartment enclosed by the sealed container, said primary seal having an inward side toward said internal compartment and an outward side opposite to said inward side, said primary seal serving to maintain a fluid tight seal thereacross between the inward and outward sides thereof; said sealed container also having marginal edge portions connecting with said parts of the container and extending outwardly from said primary seal in an overlapping relationship, comprising:

a frame;

at least one container support piece connected to the frame for supporting a sealed container in a desired position;

at least one clamping member mounted to said frame for movement relative to said container support piece and a container supported thereon to clamp marginal edge portions of the container and secure a temporary secondary seal spaced from said primary seal, to thereby form a test chamber enclosed by the marginal edge portions of the container parts, the primary seal and the secondary seal;

supply passage forming means mounted for engaging at least one marginal edge portion of the sealed container at a position adjacent the test chamber; said supply passage forming means acting to form a testing fluid supply passage through the marginal edge portions to provide fluid communication therethrough and with the test chamber;

wherein said supply passage forming means is an injection probe having a probe fluid passageway formed therein for communicating fluid therethrough to supply the desired testing pressure to the test chamber;

means for driving the injection probe into the preformed test chamber groove;

means for supplying a desired testing pressure to the testing fluid supply passage and test chamber to thereby create a desired differential pressure across the primary seal so that fluid transfer will occur through any leaks present in the primary seal;

detector means for detecting an effect selectively associated with transfer of fluid through a leak in the primary seal.

17. An apparatus for nondestructively testing a sealed container to detect for leaks existing in at least one preformed primary seal which connects at least two parts of the container in sealed relationship, said primary seal serving to at least partially seal an internal compartment enclosed by the sealed container, said primary seal having an inward side toward said internal compartment and an outward side opposite to said inward side, said primary seal serving to maintain a fluid tight seal thereacross between the inward and outward sides thereof; said sealed container also having marginal edge portions connecting with said parts of the container and extending outwardly from said primary seal in an overlapping relationship, comprising:

a frame;

at least one container support piece connected to the frame for supporting a sealed container in a desired position;

at least one clamping member mounted to said frame for movement relative to said container support piece and a container supported thereon to clamp marginal edge portions of the container and secure a temporary secondary seal spaced from said primary seal, to thereby form a test chamber enclosed by the marginal edge portions of the container parts, the primary seal and the secondary seal;

supply passage forming means mounted for engaging at least one marginal edge portion of the sealed container at a position adjacent the test chamber;

said supply passage forming means acting to form a testing fluid supply passage through the marginal edge portions to provide fluid communication therethrough and with the test chamber;

means for supplying a desired testing pressure to the testing fluid supply passage and test chamber to thereby create a desired differential pressure across the primary seal so that fluid transfer will occur through any leaks present in the primary seal;

detector means for detecting an effect selectively associated with transfer of fluid through a leak in the primary seal;

wherein said supply passage forming means is comprised of at least one injection probe having a probe fluid passageway formed therein for communicating fluid therethrough to supply the desired testing pressure to the test chamber;

said injection probe being mounted to laterally engage between the marginal edge portions of the container parts;

and further comprising a marginal edge portion tensioning means for tensioning the marginal edge portions of the container parts adjacent to an injection point at which the injection probe enters between the marginal edge portions of the container parts.

18. An apparatus according to claim 17 and further comprising a probe driving means for controllably moving the probe into engagement between the marginal edge portions of the container parts 19. An apparatus for nondestructively testing a sealed container to detect for leaks existing in at least one preformed primary seal which connects at least two parts of the container in sealed relationship, said primary seal serving to at least partially seal an internal compartment enclosed by the sealed container, said primary seal having an inward side toward said internal compartment and an outward side opposite to said inward side, said primary seal serving to maintain a fluid tight seal thereacross between the inward and outward sides thereof; said sealed container also having marginal edge portions connecting with said parts of the container and extending outwardly from said primary seal in an overlapping relationship, comprising:

a frame;

at least one container support piece connected to the frame for supporting a sealed container in a desired position;

at least one clamping member mounted to said frame for movement relative to said container support piece and a container supported thereon to clamp marginal edge portions of the container and secure a temporary secondary seal spaced from said primary seal, to thereby form a test chamber enclosed by the marginal edge portions of the container parts, the primary seal and the secondary seal;

supply passage forming means mounted for engaging at least one marginal edge portion of the sealed container at a position adjacent the test chamber;

said supply passage forming means acting to form a testing fluid supply passage through the marginal edge portions to provide fluid communications therethrough and with the test chamber;

means for supplying a desired testing pressure to the testing fluid supply passage and test chamber to thereby create a desired differential pressure across the primary seal so that fluid transfer will occur through any leaks present in the primary seal;

detector means for detecting an effect selectively associated with transfer of fluid through a leak in the primary seal; and means for driving the supply passage forming means to form the testing fluid supply passage through the temporary secondary seal.

20. An apparatus according to claim 19 wherein said supply passage forming means is a piloting probe which forms an opening in at least one of the marginal edge portions to thereby allow the desired testing pressure to be communicated therethrough to the test chamber.

21. An apparatus according to claim 19 wherein said supply passage forming means is a probe which engages a container part considered a semi-rigid container base along a preformed test chamber groove formed in a marginal edge flange of said container base.

22. A device for applying a desired differential pressure across the primary seal of a sealed container comprised of first and second container members forming at least one material receiving compartment situated to an inward side of the primary seal, the members including marginal edge portions extending outwardly of the primary seal, opposite the material receiving compartment, to a secondary seal and beyond to separable edges, wherein the device is comprised of:

clamp means for securing the secondary seal between the marginal edge portions outward of the primary seal to thereby secure a test chamber defined by the primary seal, the secondary seal and areas of the container members between the primary seal and secondary seal;

passage forming means for producing a fluid passage opening into the test chamber;

wherein the passage forming means includes a probe with the fluid passage formed therein and a fluid discharge opening adjacent a pointed probe end;

drive means for positioning the probe fluid discharge opening within the test chamber between the separable edges;

wherein said drive means operates to impress the probe between the marginal edge portions to engage and at least partially form the separable edges;

differential pressure means for producing a pressure differential through the fluid passage to the test chamber; and wherein the fluid passage is connected to the differential pressure means.

23. The device of claim 22 wherein the pressurized fluid is a gas under pressure up to approximately 500 psi gauge.

24. The device of claim 22 wherein the clamp means includes a pair of clamp members and means for urging the clamp members together against the container marginal edge portions to compress and clamp the marginal edge portions together thereby securing the secondary seal outward of the primary seal.

25. The device of claim 22 wherein the clamp means includes a pair of clamp members with one of the pair of clamp member including a recess formed therein for receiving the probe and receiving and forming one of the container marginal edge portions responsive to impression of the probe and application of differential pressure from the differential pressure means.

26. The device of claim 22 further comprising tightener means on the clamp means for engaging and pulling the first container marginal edge portion taut and in alignment with the passage forming means.

27. The device of claim 22 wherein the clamp means includes clamp surfaces thereon for engaging and clamping the container marginal edge portions together with clamped surfaces thereof being situated along a plane including the passage forming means.

28. The device of claim 22 wherein the drive means for impressing the probe includes means for selectively translationally moving the probe to engage and part at least one of the container separable edges along an outward edge thereof such that the engaged edge is sealed against the probe.

29. The device of claim 22 wherein the clamp means includes a recess and the probe is complementary to the recess and is moved by the drive means to engage and impress at least one of the container marginal edge portions into the recess.

30. The device of claim 22 further comprising tertiary seal means on the clamp means for producing a sealed area communicating with the differential pressure means.

31. The device of claim 30 wherein the clamp means is comprised of a pair of clamp members adapted to receive the container members and to clamp the container members together to secure the secondary and tertiary seals; and
wherein the probe is mounted by the drive means to be inserted into the test chamber and thereby situate the fluid passage in open communication with the area formed by the tertiary seal communicating with the differential pressure means.

32. The device of claim 31 wherein the drive means for inserting the probe is an extendable cylinder on the one clamp member mounting the probe for movement toward and away from the remaining clamp member.

33. A device for applying a desired differential pressure across the primary seal of a sealed container comprised of first and second container members forming at, least one material receiving compartment situated to an inward side of the primary seal, the members including marginal edge portions extending outwardly of the primary seal, opposite the material receiving compartment, to a secondary seal and beyond to separable edges, wherein the device is comprised of:
clamp means for securing the secondary seal between the marginal edge portions outward of the primary seal to thereby secure a test chamber defined by the primary seal, the secondary seal and areas of the container members between the primary seal and secondary seal;
passage forming means for forming a fluid passage opening into the test chamber;
drive means for impressing the passage forming means, including means for selectively translationally moving the passage forming means to engage and part at least one of the container marginal edges along an outward edge thereof such that the engaged edge is sealed against the passage forming means;
differential pressure means for producing a pressure differential through the fluid passage to the test chamber; and
wherein the pressure differential is produced by a gas under pressure to approximately 500 psi gauge.

34. The device of claim 33 wherein the passage forming means is comprised of:
a probe;
and wherein said drive means functions to impress the probe toward the test chamber and retract the probe to engage the container edges and thereby at least initiate a fluid passage in at least one of the container members leading toward the test chamber.

35. The device of claim 33 wherein the clamp means includes a pair of clamp members and means for urging the clamp members together against the container marginal edge portions to compress and clamp the marginal edge portions together thereby securing the secondary seal outward of the primary seal.

36. The device of claim 33 wherein the passage forming means includes a probe having a pointed end.

37. The device of claim 33 wherein the clamp means includes a pair of clamp members with one of the pair of clamp member including a recess formed therein for receiving the passage forming means and receiving and forming one of the container marginal edge portions to produce an open passage therein leading to the test chamber responsive to impression of the passage forming means and application of differential pressure from the differential pressure means.

38. The device of claim 33 further comprising tertiary seal means for producing a sealed area between the clamp means and passage forming means and communicating with the differential pressure means.

39. The device of claim 33 further comprising tightener means on the clamp means for engaging and pulling one of the container marginal edge portions taut and in alignment with the passage forming means.

40. The device of claim 33 wherein the clamp means includes clamp surfaces thereon for engaging and clamping the container marginal edge portions together with clamped surfaces thereof being situated along a plane including the passage forming means.

41. The device of claim 33 wherein the passage forming means includes a probe.

42. The device of claim 41 wherein the clamp means includes a recess and the passage forming means is complementary to the recess.

43. The device of claim 33 further comprising tertiary seal means on the clamp means for producing a sealed area communicating with the differential pressure means.

44. The device of claim 1 wherein the
drive means includes means for moving the passage forming means toward the test chamber and retracting the passage forming means to engage the container edges and thereby at least initiate a fluid passage in at least one of the container members leading toward the test chamber and openly communicating with the area produced by the tertiary seal and communicating with the differential pressure means.

45. The device of claim 43 wherein the clamp means is comprised of a pair of clamp members adapted to receive the container members and to clamp the container members together to secure the secondary and tertiary seals; and
wherein the passage forming means includes a probe mounted by drive means to be inserted into the test chamber and thereby form the fluid passage in open communication with the area formed by the tertiary seal communicating with the differential pressure means.

46. The device of claim 45 wherein the drive means for inserting the probe is an extendable cylinder on the one clamp member mounting the probe for movement toward and away from the remaining clamp member.

47. A device for applying a desired differential pressure across the primary seal of a sealed container comprised of first and second container members forming at least one material receiving compartment situated to an inward side of the primary seal, the members including marginal edge portions extending outwardly of the primary seal, opposite the material receiving compartment, to a secondary seal and beyond to separable edges, wherein the device is comprised of:

clamp means for securing the secondary seal between the marginal edge portions outward of the primary seal to thereby secure a test chamber defined by the primary seal, the secondary seal and areas of the container members between the primary seal and secondary seal;

wherein the clamp means includes a pair of clamp members and means for urging the clamp members together against the container marginal edge portions to compress and clamp the marginal edge portions together thereby securing the secondary seal outward of the primary seal;

passage forming means, comprised of a probe mounted to one of the clamp members for producing a fluid passage opening into the test chamber;

tightener means on the clamp means for engaging and pulling one of the container marginal edge portions taut and in alignment with the probe; and differential pressure means for producing a pressure differential through the fluid passage to the test chamber.

48. The device of claim 47 wherein the pressure differential is produced by a pressurized gas under pressure up to approximately 500 psi gauge.

49. The device of claim 47; further comprising drive means for impressing the probe between the marginal edge portions to at least partially form the separable edges thereof into the fluid passage leading toward the test chamber.

50. The device of claim 49 wherein one member of the pair of clamp members includes a recess formed therein for receiving the probe and receiving and forming one of the container marginal edge portions to produce an open passage therein leading to the test chamber responsive to impression of the probe and application of differential pressure from the differential pressure means.

51. The device of claim 49 further comprising tertiary seal means for producing a sealed area between the clamp members and communicating with the differential pressure means.

52. The device of claim 47 wherein the clamp members include clamp surfaces thereon for engaging and clamping the container marginal edge portions together with clamped surfaces thereof being situated along a plane including the probe.

53. The device of claim 47 further comprising drive means for impressing the probe, including means for selectively translationally moving the probe to engage and part at least one of the container separable edges along an outward edge thereof such that the engaged edge is sealed against the probe.

54. The device of claim 47 wherein one of the clamp members includes a recess and the probe is complementary to the recess; and a drive means for engaging and impressing at least one of the container marginal edge portions into the recess.

55. The device of claim 47 further comprising drive means for inserting the probe, comprised of an extendable cylinder on one of the clamp members, mounting the probe for movement toward and away from the remaining clamp member.

56. An apparatus for nondestructively testing a sealed container to detect for leaks existing in at least one preformed primary seal which connects at least two parts of the container in sealed relationship, said primary seal serving to at least partially seal an internal compartment enclosed by the sealed container, said primary seal having an inward side toward said internal compartment and an outward side opposite to said inward side, said primary seal serving to maintain a fluid tight seal thereacross between the inward and outward sides thereof; said sealed container also having marginal edge portions connecting with said parts of the container and extending outwardly from said primary seal in an overlapping relationship, comprising:

a frame;

at least one container support piece connected to the frame for supporting a sealed container in a desired position;

at least one clamping member mounted to said frame for movement relative to said container support piece and a container supported thereon to clamp marginal edge portions of the container and secure a temporary secondary seal spaced from said primary seal, to thereby form a test chamber enclosed by the marginal edge portions of the container parts, the primary seal and the secondary seal;

supply passage forming means mounted for engaging at least one marginal edge portion of the sealed container at a position adjacent the test chamber; said supply passage forming means acting to form a testing fluid supply passage through said at least one marginal edge portion to provide fluid communication therethrough and with the test chamber;

means for supplying a desired testing pressure to the testing fluid supply passage and test chamber to thereby create a desired differential pressure across the primary seal so that fluid transfer will occur through any leaks present in the primary seal;

tertiary seal means on the clamp means for producing a sealed area communicating with the means for supplying a desired testing pressure; and detector means for detecting an effect selectively associated with transfer of fluid through a leak in the primary seal.

* * * * *